US012795520B2

(12) United States Patent
Ke

(10) Patent No.: US 12,795,520 B2
(45) Date of Patent: Nov. 10, 2026

(54) METHOD AND APPARATUS FOR SUPPORTING INFORMATION ACQUISITION, DEVICE, AND READABLE STORAGE MEDIUM

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 573 days.

(21) Appl. No.: 18/362,047

(22) Filed: Jul. 31, 2023

(65) Prior Publication Data

US 2023/0379806 A1 Nov. 23, 2023

Related U.S. Application Data

(63) Continuation of application No. PCT/CN2022/075539, filed on Feb. 8, 2022.

(30) Foreign Application Priority Data

Feb. 10, 2021 (CN) ......................... 202110185490.7
Apr. 6, 2021 (CN) ......................... 202110368840.3
May 10, 2021 (CN) ......................... 202110507934.4

(51) Int. Cl.
*H04W 4/00* (2018.01)
*H04W 28/02* (2009.01)
*H04W 48/16* (2009.01)

(52) U.S. Cl.
CPC ....... *H04W 48/16* (2013.01); *H04W 28/0215* (2013.01)

(58) Field of Classification Search
CPC . H04W 48/16; H04W 48/08; H04W 28/0215; H04W 8/18; H04W 12/06
USPC .......................................................... 370/329
See application file for complete search history.

(56) References Cited

U.S. PATENT DOCUMENTS

2019/0089806 A1* 3/2019 Deshpande ........... H04W 48/12
2020/0359212 A1* 11/2020 Chen ..................... H04L 63/102
2020/0403875 A1* 12/2020 Rooney ................. H04W 12/04

FOREIGN PATENT DOCUMENTS

WO 2020250664 A1 12/2020

OTHER PUBLICATIONS

Ericsson, Samsung, Intel, OPPO, Solution for UE Onboarding and provisioning for an SNPN, SA WG2 Meeting #S2-136AH, S2-2000518, Jan. 13-17, 2020, Incheon, South Korea.

Huawei, Hisilicon, KI #4, New Sol: UE onboarding and provisioning for SNPN subscription, 3GPP TSG-WG SA2 Meeting #139E e-meeting, S2-2003995, Jun. 1-12, 2020, Elbonia.

Huawei, Hisilicon, KI #4, Evaluations and conclusions on boarding and provisioning for SNPN subscription, 3GPP TSG-WG SA2 Meeting #140E e-meeting, S2-2005623, Aug. 19-Sep. 1, 2020, Elbonia.

(Continued)

*Primary Examiner* — Temica M Beamer
(74) *Attorney, Agent, or Firm* — Price Heneveld LLP

(57) ABSTRACT

A method and an apparatus for supporting information acquisition, a device, and a readable storage medium are provided. The method includes: sending first information to a first network, where the first information includes first configuration information and/or information associated with the first configuration information.

20 Claims, 9 Drawing Sheets

(56) References Cited

OTHER PUBLICATIONS

Samsung, KI #4, Sol #5: Update to clarify how the UE discovers and selects the onboarding network, SA WG2 Meeting #141E, S2-2007535, Oct. 12-Oct. 23, 2020, Electronic, Elbonia.
"3rd Generation Partnership Project; Technical Specification Group Services and System Aspects; Study on enhanced support of non-public networks (Release 17)" 3GPP TR 23.700-07 V1.2.0 (Nov. 2020), Valbonne, France.
"3rd Generation Partnership Project; Technical Specification Group Services and System Aspects; Study on enhanced security support for Non-Public Networks; (NPN); (Release 17)", 3GPP TR 33.857 V0.4.0 (Feb. 2021), Valbonne, France.
"3rd Generation Partnership Project; Technical Specification Group Services and System Aspects; Procedures for the 5G System (5GS); Stage 2 (Release 16)", 3GPP TS 23.502 V16.7.1 (Jan. 2021), Valbonne, France.
"3rd Generation Partnership Project; Technical Specification Group Services and System Aspects; Procedures for the 5G System (5GS); Stage 2 (Release 17)", 3GPP TS 23.502 V17.3.0 (Dec. 2021), Valbonne, France.
Samsung, "KI #4, Sol #5: Update to clarify how the UE discovers and selects the onboarding network", SA WG2 Meeting #141E, S2-2007851,Oct. 12-Oct. 23, 2020, Electronic, Elbonia.

* cited by examiner

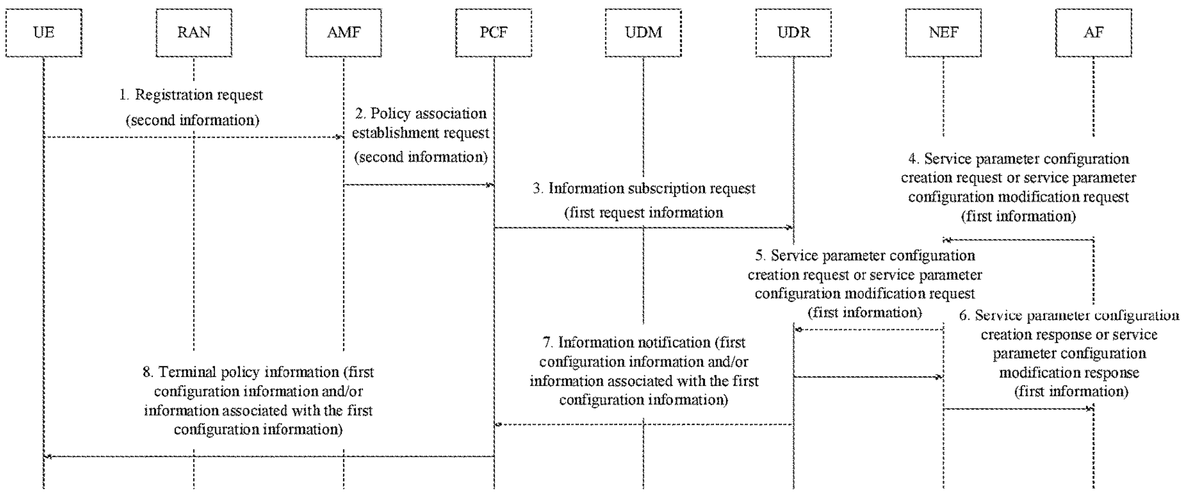
FIG. 7-A
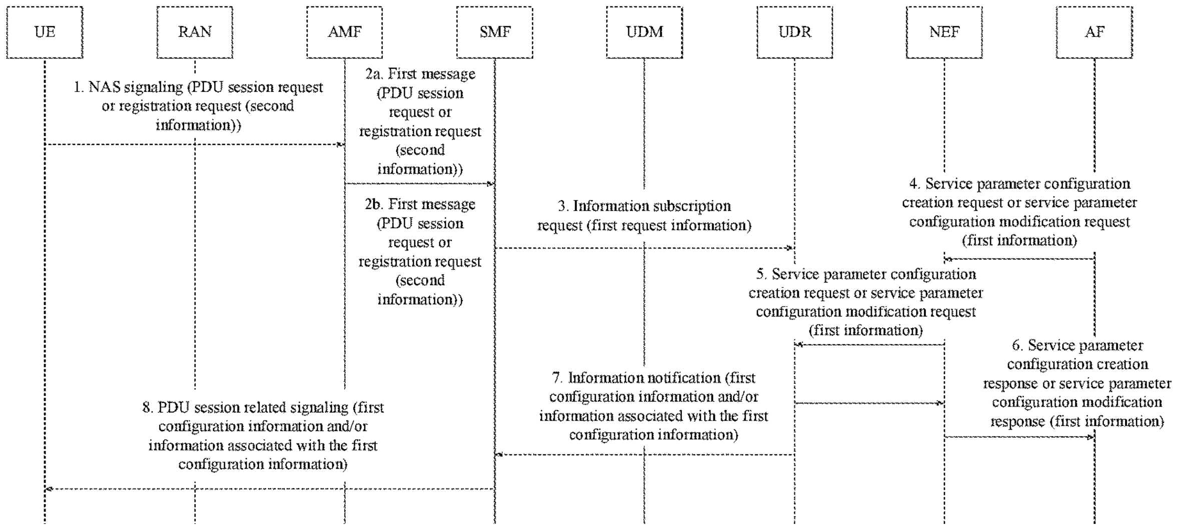
FIG. 7-B

METHOD AND APPARATUS FOR SUPPORTING INFORMATION ACQUISITION, DEVICE, AND READABLE STORAGE MEDIUM

CROSS-REFERENCE TO RELATED APPLICATIONS

This application is a continuation application of International Application No. PCT/CN2022/075539 filed on Feb. 8, 2022, which claims priority to Chinese Patent Application No. 202110185490.7, filed in China on Feb. 10, 2021, Chinese Patent Application No. 202110368840.3, filed in China on Apr. 6, 2021, and Chinese Patent Application No. 202110507934.4, filed in China on May 10, 2021, which are incorporated herein by reference in their entireties.

TECHNICAL FIELD

This application pertains to the field of communications technologies, and specifically relates to a method and an apparatus for supporting information acquisition, a device, and a readable storage medium.

BACKGROUND

A terminal (for example, user equipment (UE)) wishes to temporarily access a first network to obtain a credential and/or subscription. However, how to acquire configuration information from the first network for the terminal to acquire the credential and/or subscription is an urgent problem to be resolved.

SUMMARY

Embodiments of this application provide a method and an apparatus for supporting information acquisition, a device, and a readable storage medium.

According to a first aspect, a method for supporting information acquisition is provided. The method is performed by a first communications device and includes:

sending first information to a first network, where the first information includes first configuration information and/or information associated with the first configuration information, where the first configuration information includes address information of a first server, where the first server is capable of configuring a credential and/or subscription of a first object for a terminal; and the information associated with the first configuration information includes at least one of the following:

identification information of the first object;

group identification information of a network group to which the first object belongs;

slice information associated with the first object;

DN information associated with the first object;

identification information of a network to which the first server belongs;

group identification information of a network group to which the first server belongs;

type information of the credential and/or subscription;

indication information for indicating a first access mode;

slice information associated with the first configuration information; and

DN information associated with the first configuration information.

According to a second aspect, a method for supporting information acquisition is provided. The method is performed by a second communications device and includes:

acquiring first information, where the first information includes first configuration information and/or information associated with the first configuration information; and performing a first operation based on the first information, where the first operation includes at least one of the following:

saving the first information;

generating index information of the first configuration information for the first configuration information, where the index information of the first configuration information is one or more items of the information associated with the first configuration information;

generating index information of a first server for address information of the first server, where the index information of the address information of the first server is one or more items of information associated with the first server;

acquiring first request information, and querying or receiving subscribed first configuration information based on the first request information;

sending the queried or subscribed first configuration information and/or information associated with the first configuration information;

acquiring slice information of a terminal and/or DN information of a terminal, and confirming, based on the slice information of the terminal and/or the DN information of the terminal, first configuration information associated with the slice information of the terminal and/or the DN information of the terminal;

sending the first configuration information and/or the information associated with the first configuration information, where the first configuration information is the first configuration information associated with the slice information of the terminal and/or the DN information of the terminal;

selecting a first target end and/or selecting a data channel of the terminal;

sending the first information to the first target end and/or sending the first information by using related signaling of the data channel of the terminal; and setting a priority of the first information to be higher than a priority of policy information related to a data operation, where the first configuration information includes the address information of the first server, where the first server is capable of configuring a credential and/or subscription of a first object for the terminal; and the information associated with the first configuration information includes at least one of the following:

identification information of the first object;

group identification information of a network group to which the first object belongs;

slice information associated with the first object;

DN information associated with the first object;

identification information of a network to which the first server belongs;

group identification information of a network group to which the first server belongs;

type information of the credential and/or subscription;

slice information associated with the first configuration information;

DN information associated with the first configuration information; and indication information for indicating a first access mode, indicating one of the following: the first configuration service information is used for the terminal that accesses a first network in the first access mode, and the first server is capable of configuring the credential and/or subscription of the first object for the terminal that accesses the first network in the first access mode.

According to a third aspect, a method for supporting information acquisition is provided. The method is performed by a third communications device and includes:

acquiring second information, where the second information includes at least one of the following: indication information for indicating a first access mode, type information of a credential and/or subscription, identification information of a second object, group identification information of a network group to which the second object belongs, slice information associated with the second object, DN information associated with the second object, identification information of a second network, group identification information of a second network group, where the second network group is a network group to which the second network belongs, slice information of a terminal, DN information of the terminal, connection establishment request information, registration request information, and data channel establishment request information; and performing a second operation based on the second information, where the second operation includes at least one of the following:

selecting or querying a target communications device based on the second information;

sending first request information to the target communications device; and sending the second information, where the type information of the credential and/or subscription includes at least one of the following: a credential and/or subscription used for primary authentication and/or authorization, and a credential and/or subscription used for non-primary authentication and/or authorization.

According to a fourth aspect, a method for supporting information acquisition is provided. The method is performed by a fourth communications device and includes:

acquiring network element query information and/or index information of a communications device, where the network element query information includes at least one of the following: indication information for indicating a first access mode, type information of a credential and/or subscription, identification information of a second object, group identification information of a network group to which the second object belongs, identification information of a second network, group identification information of a second network group, where the second network group is a network group to which the second network belongs, slice information, and DN information; and performing a third operation based on the network element query information and/or the index information of the communications device, where the third operation includes at least one of the following:

matching a target communications device based on the network element query information; and sending information about the target communications device.

According to a fifth aspect, a method for supporting information acquisition is provided. The method is performed by a fifth communications apparatus and includes:

a fourth acquiring module, configured to acquire first configuration information and/or information associated with the first configuration information.

According to a sixth aspect, a method for supporting information acquisition is provided. The method is performed by a sixth communications device and includes:

sending network element registration information, where the network element registration information includes at least one of the following: indication information for indicating a first access mode, type information of a credential and/or subscription, identification information of a third object, group identification information of a network group to which the third object belongs, identification information of a third network, and group identification information of a third network group, where the third object includes at least one of the following: a network A, an entity in a data network, an entity outside a first network, primary authentication and/or authorization, and non-primary authentication and/or authorization.

According to a seventh aspect, an apparatus for supporting information acquisition is provided. The apparatus is applied to a first communications device and includes:

a first sending module, configured to send first information to a first network, where the first information includes first configuration information and/or information associated with the first configuration information, where the first configuration information includes address information of a first server, where the first server is capable of configuring a credential and/or subscription of a first object for a terminal; and the information associated with the first configuration information includes at least one of the following:

identification information of the first object;

group identification information of a network group to which the first object belongs;

slice information associated with the first object;

DN information associated with the first object;

identification information of a network to which the first server belongs;

group identification information of a network group to which the first server belongs;

type information of the credential and/or subscription;

indication information for indicating a first access mode;

slice information associated with the first configuration information; and

DN information associated with the first configuration information.

According to an eighth aspect, an apparatus for supporting information acquisition is provided. The apparatus is applied to a second communications device and includes:

a first acquisition module, configured to acquire first information, where the first information includes first configuration information and/or information associated with the first configuration information; and a first execution module, configured to perform a first operation based on the first information, where the first operation includes at least one of the following:

saving the first information;

generating index information of the first configuration information for the first configuration information, where the index information of the first configuration information is one or more items of the information associated with the first configuration information;

generating index information of a first server for address information of the first server, where the index information of the address information of the first server is one or more items of information associated with the first server;

acquiring first request information, and querying or receiving subscribed first configuration information based on the first request information;

sending the queried or subscribed first configuration information and/or information associated with the first configuration information;

acquiring slice information of a terminal and/or DN information of a terminal, and confirming, based on the slice information of the terminal and/or the DN information of the terminal, first configuration information associated with the slice information of the terminal and/or the DN information of the terminal;

sending the first configuration information and/or the information associated with the first configuration information, where the first configuration information is the first configuration information associated with the slice information of the terminal and/or the DN information of the terminal;

selecting a first target end and/or selecting a data channel of the terminal;

sending the first information to the first target end and/or sending the first information by using related signaling of the data channel of the terminal; and setting a priority of the first information to be higher than a priority of policy information related to a data operation, where the first configuration information includes the address information of the first server, where the first server is capable of configuring a credential and/or subscription of a first object for the terminal; and the information associated with the first configuration information includes at least one of the following:

identification information of the first object;

group identification information of a network group to which the first object belongs;

slice information associated with the first object;

DN information associated with the first object;

identification information of a network to which the first server belongs;

group identification information of a network group to which the first server belongs;

type information of the credential and/or subscription;

slice information associated with the first configuration information;

DN information associated with the first configuration information; and indication information for indicating a first access mode, indicating one of the following: the first configuration service information is used for the terminal that accesses a first network in the first access mode, and the first server is capable of configuring the credential and/or subscription of the first object for the terminal that accesses the first network in the first access mode.

According to a ninth aspect, an apparatus for supporting information acquisition is provided. The apparatus is applied to a third communications device and includes:

a second acquisition module, configured to acquire second information, where the second information includes at least one of the following: indication information for indicating a first access mode, type information of a credential and/or subscription, identification information of a second object, group identification information of a network group to which the second object belongs, slice information associated with the second object, DN information associated with the second object, identification information of a second network, group identification information of a second network group, where the second network group is a network group to which the second network belongs, slice information of a terminal, DN information of the terminal, connection establishment request information, registration request information, and data channel establishment request information; and a second execution module, configured to perform a second operation based on the second information, where the second operation includes at least one of the following:

selecting or querying a target communications device based on the second information;

sending first request information to the target communications device; and sending the second information, where the type information of the credential and/or subscription includes at least one of the following: a credential and/or subscription used for primary authentication and/or authorization, and a credential and/or subscription used for non-primary authentication and/or authorization.

According to a tenth aspect, an apparatus for supporting information acquisition is provided. The apparatus is applied to a fourth communications device and includes:

a third acquisition module, configured to acquire network element query information and/or index information of a communications device, where the network element query information includes at least one of the following: indication information for indicating a first access mode, type information of a credential and/or subscription, identification information of a second object, group identification information of a network group to which the second object belongs, identification information of a second network, group identification information of a second network group, where the second network group is a network group to which the second network belongs, slice information, and DN information; and a third execution module, configured to perform a third operation based on the network element query information and/or the index information of the communications device, where the third operation includes at least one of the following:

matching a target communications device based on the network element query information; and sending information about the target communications device.

According to an eleventh aspect, an apparatus for supporting information acquisition is provided. The apparatus is applied to a fifth communications apparatus and includes:

a fourth acquiring module, configured to acquire first configuration information and/or information associated with the first configuration information.

According to a twelfth aspect, an apparatus for supporting information acquisition is provided. The apparatus is applied to a sixth communications device and includes:

a third sending module, configured to send network element registration information, where the network element registration information includes at least one of the following: indication information for indicating a first access mode, type information of a credential and/or subscription, identification information of a third object, group identification information of a network group to which the third object belongs, identification information of a third network, and group identification information of a third network group, where the third object includes at least one of the following: a network A, an entity in a data network, an entity outside a first network, primary authentication and/or authorization, and non-primary authentication and/or authorization.

According to a thirteenth aspect, a terminal is provided and includes a processor, a memory, and a program stored in the memory and capable of running on the processor. When the program is executed by the processor, the steps of the method according to the fifth aspect are implemented.

According to a fourteenth aspect, a network-side device is provided and includes a processor, a memory, and a program stored in the memory and capable of running on the processor. When the program is executed by the processor, the steps of the method according to the first aspect, the second aspect, the third aspect, the fourth aspect, or the sixth aspect are implemented.

According to a fifteenth aspect, a readable storage medium is provided. The readable storage medium stores a program or instructions. When the program or instructions are executed by a processor, the steps of the foregoing method are implemented.

According to a sixteenth aspect, a computer program product is provided. The computer program product is stored in a non-transitory storage medium. The computer program product is executed by at least one processor to implement the steps of the foregoing method.

According to a seventeenth aspect, a chip is provided. The chip includes a processor and a communications interface. The communications interface is coupled to the processor. The processor is configured to run a program or instructions to implement the steps of the foregoing method.

In the embodiments of this application, acquisition of the configuration information by the terminal is supported, where the configuration information includes the address information of the first server, and the terminal can acquire the credential and/or subscription from the first server by using the first network.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

FIG. 7-A and FIG. 7-B are schematic diagrams of a method for supporting information acquisition according to an embodiment of this application;

DETAILED DESCRIPTION OF EMBODIMENTS

Figure 1:
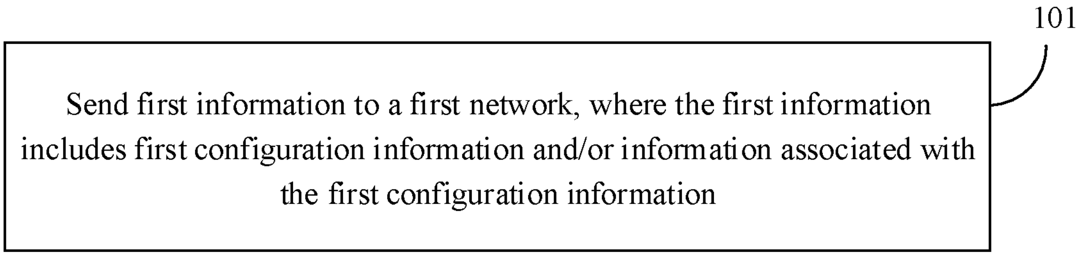
FIG. 1 is a first schematic diagram of a method for supporting information acquisition according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "/" generally indicates that the associated objects are in an "and/or" relationship.

It should be noted that techniques described in the embodiments of this application are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

In the related art, a terminal (for example, user equipment (UE)) can access a public land mobile network (PLMN) or a standalone non-public network (SNPN) 1 to download a credential of an SNPN 2. When the UE does not have a credential of the SNPN 1, if the SNPN 1 supports an onboarding function, the SNPN 1 may be referred to as an onboarding SNPN, or referred to as an O-SNPN for short. In a case of an onboarding SNPN, the UE does not have a credential of the O-SNPN, a default credential is used to access the O-SNPN, and an onboarding indication needs to be provided to indicate particularity of a registration type of the UE. Therefore, in an O-SNPN scenario, two functions are included:

(1) default credential onboarding; and (2) credential and/or subscription downloading.

In a user-plane credential download manner, the UE may need to acquire a provisioning server (PS) address from the SNPN 1 or the PLMN. An application function (AF) may configure, for the network, a PS address that needs to be configured for the UE.

Problem 1: Because the UE has only the default credential, the AF cannot provide an associated generic public subscription identifier (GPSI) or a UE group identifier (Group ID). Moreover, the O-SNPN may serve a plurality of SO-SNPNs, and PS addresses corresponding to the SO-SNPNs may be different. Therefore, it is not enough for the AF to provide only the PS address. The AF needs to provide the PS address and information associated with the PS address. For example, the information associated with the PS address includes an SO-SNPN ID or an SO-SNPN group ID.

One solution idea is that the UE registers with an access and mobility management function (AMF) of a first network (for example, the O-SNPN) and provides indication information (for example, an onboarding indication) for indicating a first access mode. Because the AMF cannot index a unified data manager (UDM) or unified data repository (UDR) of the O-SNPN based on an UE identifier (ID) of the UE (for example, a subscription permanent identifier (SUPI)), but can index an onboarding UDM or UDR according to the onboarding indication and query or subscribe to address information of a first server from the UDM or UDR. When a plurality of first servers exist, during registration, the UE can also provide information associated with a first provisioning server, such as identification information of a second object (for example, an SO-SNPN), for requesting to acquire the address information of the first server corresponding to the SO-SNPN.

Problem 2: An existing information index (for example, a data key) is supported only based on a terminal identifier or a terminal group identifier. However, when the AF configures the address information of the first server for the first network, the AF is not sure which terminals will access the first network to acquire the address information. Therefore, the address information of the first server cannot be indexed based on the information index of the terminal identifier or terminal group identifier.

One solution idea is to add a new data key: an SO-SNPN ID or an onboarding indication for information indexing.

Problem 3: Core network elements such as the UDM, the UDR, and a policy control function (PCF) cannot be determined by using a subscription permanent identifier (SUPI) associated with the default credential of the UE.

One solution idea is to determine the core network elements by using the onboarding indication, that is, core network elements dedicated to an onboarding mode exist in the first network.

Another solution idea is to determine the core network elements by using an SO-SNPN identifier, that is, core network elements dedicated to the SO-SNPN exist in the first network.

Problem 4: When there are a plurality of provisioning server addresses to be configured for the UE, additional associated information needs to be provided for each provisioning server address; otherwise, the UE does not know how to select one of the provisioning server addresses for use.

Problem 5: In an existing definition, a priority of a policy and charging control rule (PCC rule) is higher than a priority of first information stored locally in an SMF or higher than a priority of a data operation rule that is set based on locally stored first information. Because externally acquired first information is latest and should have a higher priority, if the PCF still sets the PCC rule based on the locally configured first information, on a basis that the priority of the existing PCC rule is higher than the priority of the first information stored locally in the SMF, an error occurs when the SMF sets the data operation rule according to the PCC rule. Therefore, one solution idea is to send the latest first information to the PCF or to set the priority of the received acquired first information to be higher than the priority of the PCC rule.

In an implementation, local storage and local configuration are sometimes used interchangeably.

In an optional embodiment of this application, optionally, acquiring or obtaining may be understood as acquiring from configuration, receiving, receiving by requesting, acquiring by self-learning, acquiring by deduction based on unreceived information, or acquiring after processing based on received information, which may be specifically determined according to actual requirements and is not limited in the embodiments of this application. For example, when specific capability indication information sent by a device is not received, it can be deduced that the device does not support the capability.

In an optional embodiment of this application, the term "sending" may include broadcasting, broadcasting in system information, and returning in response to a request.

In an optional embodiment of this application, the term "capable" may indicate at least one of the following: allowed, supported, preferred, and preferentially capable. The term "incapable" may indicate at least one of the following: not allowed, not supported, not permitted, not preferred, and not capable.

In an optional embodiment of this application, a communications device may include at least one of the following: a communications network element and a terminal.

In an optional embodiment of this application, the communications network element may include at least one of the following: a core network element and a radio access network (RAN) network element.

In an optional embodiment of this application, the core network (CN) network element may include but is not limited to at least one of the following: a core network device, a core network node, a core network function, a core network element, a mobility management entity (MME), an access and mobility management function (AMF), a session management function (SMF), a user plane function (UPF), a serving gateway (SGW), a PDN gateway (PDN gateway), a policy control function (PCF), a policy and charging rules function (PCRF), a serving GPRS support node (SGSN), a gateway GPRS support node (GGSN), unified data management (UDM), a unified data repository (UDR), a home subscriber server (HSS), and an application function (AF).

In an optional embodiment of this application, the RAN network element may include but is not limited to at least one of the following: a radio access network device, a radio access network node, a radio access network function, a radio access network element, a 3rd Generation Partnership Project (3GPP) radio access network, a non-3GPP radio access network, a centralized unit (CU), a distributed unit (DU), a base station, an evolved NodeB (eNB), a 5G gNB (gNB), a radio network controller (RNC), a NodeB, a non-3GPP interworking function (N3IWF), an access controller (AC) node, an access point (AP) device, a wireless local area network (WLAN) node, and an N3IWF.

In an optional embodiment of this application, the first access mode includes at least one of the following: an access mode for accessing a network to acquire a credential and/or subscription, an access mode with limited access to a network, and an access mode using a default credential to access a network.

In an implementation, a mode with limited access to a network to download a credential for accessing a first object, or a mode for accessing a network to download a credential for accessing a first object may be referred to as onboarding. When the first object includes a network A, the first network and the network A may be the same network or different networks. The first network is a network accessed by the terminal, such as a network that is currently accessed.

In an optional embodiment of this application, the first server is used to configure a credential and/or subscription of a first object for the terminal.

In an optional embodiment of this application, support for configuring a credential and/or subscription is used to further indicate at least one of the following: support for configuring a credential and/or subscription in a control plane mode and support for configuring a credential and/or subscription in a user plane mode.

In an optional embodiment of this application, nonsupport for configuring a credential and/or subscription is used to further indicate nonsupport for configuring a credential and/or subscription in a control plane mode and nonsupport for configuring a credential and/or subscription in a user plane mode.

In an optional embodiment of this application, acquisition of a credential and/or subscription is remote acquisition of the credential and/or subscription. For example, in a case that the terminal accesses the first network to acquire the credential and/or subscription, a provider of the credential and/or subscription is a first entity. The first entity is an entity in a data network (DN) or an entity outside the network accessed by the terminal.

In an optional embodiment of this application, the provider of the credential and/or subscription is one of the following: an entity outside the first network, an entity outside the network accessed by the terminal, an entity in the data network (DN), and an entity in another network. The entity in the data network may be an application server, or a server for configuring the credential and/or subscription in the data network. A purpose of accessing the network by the terminal includes acquiring the credential and/or subscription.

In an optional embodiment of this application, the credential and/or subscription is a credential and/or subscription of the network accessed by the terminal. The credential and/or subscription of the network accessed by the terminal includes at least one of the following: a credential and/or subscription for the terminal for unlimited access to the network, and a credential and/or subscription for the terminal for limited access to the network.

In an optional embodiment of this application, the credential and/or subscription include/includes at least one of the following: a credential and/or subscription for unlimited access, a credential and/or subscription for limited access, a credential and/or subscription for primary authentication and/or authorization, and a credential and/or subscription for non-primary authentication and/or authorization. Primary authentication (for example, primary identity authentication, Primary Authentication) may include: Authentication and Key Agreement (AKA), for example, $5^{th}$ Generation communications technology (5G) AKA, and Extensible Authentication Protocol (EAP) AKA.

Non-primary authentication and/or authorization include/includes at least one of the following: secondary authentication and/or authorization, and slice-specific authentication and/or authorization (NSSAA Network Slice-Specific Authentication and Authorization). It is not difficult to understand that slice information associated with non-primary authentication and/or authorization includes slice information associated with "slice-specific authentication and/or authorization", which may indicate authentication and/or authorization with respect to whether the terminal is allowed to access a slice indicated by the slice information. A slice associated with non-primary authentication and/or authorization and/or DN information associated with non-primary authentication and/or authorization include/includes slice information and/or DN information associated with secondary authentication and/or authorization, which may indicate authentication and/or authorization with respect to whether the terminal is allowed to access the slice and/or a DN.

In an implementation, the slice information may represent information about the slice.

In an implementation, the slice information may include one of the following: single network slice selection assistance information (S-NSSAI), and network slice selection assistance information (NSSAI).

In an implementation, the DN information may represent information about the DN.

In an implementation, the DN information may include at least one of the following: a data network name (DNN) (which may also be referred to as an access point name (APN)), and identification information of the DN.

In an implementation, the terminal may use a credential (for example, a default credential) and/or subscription for limited access to a network to access the first network, and then acquire a credential and/or subscription with unlimited access to the first object (including the network A) through the first network. The network A is the same as or different from the first network.

In an optional embodiment of this application, acquiring the credential and/or subscription in the control plane mode and/or configuring the credential and/or subscription in the control plane mode includes at least one of the following: the first entity configures the credential and/or subscription for the terminal by using control plane signaling of the network accessed by the terminal; and the terminal acquires the credential and/or subscription from the first entity by using the control plane signaling of the network accessed by the terminal.

In an optional embodiment of this application, acquiring the credential and/or subscription in the user plane mode and/or configuring the credential and/or subscription in the user plane mode includes at least one of the following: the terminal establishes a data channel in the accessed network, and acquires the credential and/or subscription from the first entity through the data channel; or the first entity configures the credential and/or subscription for the terminal through the data channel established by the terminal in the accessed network.

In an optional embodiment of this application, the data channel includes but is not limited to one of the following: a protocol data unit (PDU) session, a public data network (PDN) connection, a quality of service (QoS) flow, a bearer, and an Internet Protocol Security (IPsec) channel, where the bearer may be an evolved radio access bearer (E-RAB), a radio access bearer (RAB), a data radio bearer (DRB), a signaling radio bearer (SRB), or the like.

In an optional embodiment of this application, a network allowed to be accessed by using the default credential includes: a network where the terminal can acquire a limited connection by using a terminal identifier corresponding to the default credential for access.

In an optional embodiment of this application, the default credential includes a credential for a limited access mode.

In an optional embodiment of this application, limited access and the limited connection have the same meaning and may be used interchangeably.

In an implementation, the limited access includes at least one of the following: allowing only establishment of a first data channel, not allowing establishment of a data channel other than the first data channel, allowing only acquisition of the credential and/or subscription, and not allowing acquisition of services other than the credential and/or subscription. The first data channel is used to acquire the credential and/or subscription.

In an implementation, the credential and/or subscription of the first object can be acquired through the limited access.

In an optional embodiment of this application, the limited access includes limited control plane access and/or limited user plane access.

In an optional embodiment of this application, the limited connection includes a limited control plane connection and/or a limited user plane connection. The credential and/or subscription may be acquired through the limited connection.

In an optional embodiment of this application, the network that can be accessed by using the default credential includes a network that is accessed by using the terminal identifier corresponding to the default credential and in which successful authentication and/or authorization can be performed by using the default credential.

In an optional embodiment of this application, the subscription includes subscription data, such as slice information, and a data network name (DNN).

In an optional embodiment of this application, a second communications device, a third communications device, a fourth communications device, or a sixth communications device is a communications device in the first network.

In an optional embodiment of this application, an object (for example, the first object, a second object, or a third object) includes at least one of the following: the network A, an entity in the data network, an entity outside the first network, primary authentication and/or authorization, and non-primary authentication and/or authorization.

The network A is the same as or different from the first network.

The network A is the same as or different from the network accessed by the terminal.

In an optional embodiment of this application, a network type of the first network, the network accessed by the terminal, and/or a network type of the network A include/includes at least one of the following: a public network, a non-public network, a public land mobile network (PLMN), a non-standalone non-public network (Public Network Integrated Non-Public Network, PNI NPN), and a standalone non-public network (SNPN).

In an optional embodiment of this application, the indication information for indicating the first access mode may be embodied as a registration type for identifying a registration type of the first access mode.

In an optional embodiment of this application, the network A or a second network includes: an SNPN network (for example, an SO-SNPN) of a credential and/or subscription holder.

In an implementation, the first server includes a server configuring credential and/or subscription information for the terminal; and the credential and/or subscription information may be at least one of the following: credential and/or subscription information for accessing the first object, a credential and/or subscription used for primary authentication and/or authorization, and credential and/or subscription information for non-primary authentication and/or authorization.

Non-primary authentication and/or authorization include/includes at least one of the following: secondary authentication and/or authorization, and slice-specific secondary authentication and/or authorization;

the first object includes a slice of a network, the DN, and the network; and the type of the network includes at least one of the following: the SNPN, the PNI NPN, and the PLMN.

In an implementation, the slice information of the terminal includes at least one of the following: slice information requested by the terminal, slice information allowed for the terminal, slice information subscribed to by the terminal, and slice information configured for the terminal.

In an implementation, the slice information requested by the terminal includes at least one of the following: slice information requested by the terminal when the terminal establishes a session; and slice information requested by the terminal when the terminal registers with the network.

In an implementation, the DN information of the terminal includes at least one of the following: DN information requested by the terminal, DN information allowed for the terminal, DN information subscribed to by the terminal, and DN information configured for the terminal.

In an implementation, the DN information requested by the terminal includes at least one of the following: DN information requested by the terminal when the terminal establishes a session; and DN information requested by the terminal when the terminal registers with the network.

It is not difficult to understand that non-primary authentication (for example, secondary authentication and slice authentication) is associated with the slice of the terminal and/or the DN information of the terminal. In a case that the corresponding first server for downloading the credential for non-primary authentication needs to be configured for the terminal, association can be performed by using the slice information of the terminal and/or the DN information of the terminal.

In an implementation, the registration request information (including a registration request message) includes slice information requested by the terminal.

In an implementation, the data channel (for example, PDU session) establishment request information (including a data channel establishment request message) includes at least one of the following: slice information requested by the terminal, and DN information requested by the terminal.

In an implementation, the terminal establishes a connection to the network by using connection establishment request information (for example, a connection establishment request message, or a service request message).

It is not difficult to understand that non-primary authentication (for example, secondary authentication and slice authentication) is associated with the slice of the terminal and/or the DN information of the terminal. In a case that the corresponding first server for downloading the credential for non-primary authentication needs to be configured for the terminal, association can be performed by using the slice information of the terminal and/or the DN information of the terminal.

In an implementation, when first configuration information includes address information of a plurality of first servers, acquiring the first configuration information and the information associated with the first configuration information can help the terminal confirm which association information is associated with each first server. For example, a first server A is associated with a slice A and a second server B is associated with a slice B.

A method and an apparatus for supporting information acquisition, a device, and a readable storage medium provided in embodiments of this application are hereinafter described in detail by using specific embodiments and application scenarios thereof with reference to the accompanying drawings.

Referring to FIG. 1, an embodiment of this application provides a method for supporting information acquisition. The method is performed by a first communications device. The first communications device includes but is not limited to one of the following: an AF, a network exposure function (NEF), a default credential server (DCS), an authentication server function (AUSF) (for example, an AUSF in the DCS), a UDM (for example, a UDM in the DCS), and a core network element. A specific step includes step 101.

Step 101: Send first information to a first network, where the first information includes first configuration information and/or information associated with the first configuration information.

In an optional embodiment of this application, the first configuration information may be referred to as configuration information used for a first access mode.

In an optional embodiment of this application, the first configuration information includes address information of a first server, where the first server is capable of configuring a credential and/or subscription of a first object for a terminal (for example, a terminal accessing the first network).

In an optional embodiment of this application, the information associated with the first configuration information includes at least one of the following:

(1) identification information of the first object;
(2) group identification information of a network group to which the first object belongs;
(3) slice information associated with the first object;
(4) DN information associated with the first object;
(5) identification information of a network to which the first server belongs;
(6) group identification information of a network group to which the first server belongs;
(7) type information of the credential and/or subscription;
(8) indication information for indicating the first access mode, where in an optional embodiment of this application, the first object includes at least one of the following: a network A, an entity in a data network, an entity outside the first network, primary authentication and/or authorization, non-primary authentication and/or authorization, slice information, DN information, an object associated with primary authentication and/or authorization, and an object associated with non-primary authentication and/or authorization;
(9) slice information associated with the first configuration information; and
(10) DN information associated with the first configuration information, where the network A is the same as or different from the first network;

and/or the type information of the credential and/or subscription includes at least one of the following: a credential and/or subscription used for primary authentication and/or authorization, and a credential and/or subscription used for non-primary authentication and/or authorization;

and/or the indication information for indicating the first access mode indicates one of the following: the first configuration service information is used for the terminal that accesses the first network in the first access mode, and the first server is capable of configuring the credential and/or subscription of the first object for the terminal that accesses the first network in the first access mode;

and/or the terminal accessing the first network accesses the first network in the first access mode;

and/or the first server includes at least one of the following: a first server used for primary authentication and/or authorization configuration, and a first server used for non-primary authentication and/or authorization configuration, where the first server used for primary authentication and/or authorization configuration is capable of configuring the credential and/or subscription of the first object for the terminal, and the credential and/or subscription is used for primary authentication and/or authorization; and the first server used for non-primary authentication and/or authorization configuration is capable of configuring the credential and/or subscription of the first object for the terminal, and the credential and/or subscription is used for non-primary authentication and/or authorization.

In an optional embodiment of this application, a network type of the first network, the network accessed by the terminal, and/or a network type of the network A include/includes at least one of the following: a public network, a non-public network, a public land mobile network (PLMN), a non-standalone non-public network (Public Network Integrated Non-Public Network, PNI NPN), and a standalone non-public network (SNPN).

In an implementation, the slice information includes at least one of the following: slice information associated with primary authentication and/or authorization, and slice information associated with non-primary authentication and/or authorization.

In an implementation, the DN information includes at least one of the following: DN information associated with primary authentication and/or authorization, and DN information associated with non-primary authentication and/or authorization.

In an implementation, an object associated with primary authentication and/or authorization may represent an object that a primary authentication and/or authorization process determines whether to allow the terminal to access. The object associated with primary authentication and/or authorization includes at least one of the following: a slice (for example, a slice specified by the slice information), and a DN (for example, a DN specified by the DN information).

In an implementation, an object associated with non-primary authentication and/or authorization may represent an object that a non-primary authentication and/or authorization process determines whether to allow the terminal to access. The object associated with non-primary authentication and/or authorization includes at least one of the following: a slice (for example, a slice specified by the slice information), and a DN (for example, a DN specified by the DN information).

In an optional embodiment of this application, the address information of the first server includes at least one of the following: an Internet Protocol address of the first server, a media access control address of the first server, a port number of the first server, a protocol version of the first server, and address index information of the first server.

In an optional embodiment of this application, the address index information of the first server includes at least one of the following: a fully qualified domain name (FQDN) of the first server and a uniform resource locator (URL) of the first server.

In an optional embodiment of this application, the first access mode includes at least one of the following:

an access mode for accessing a network to acquire a credential and/or subscription, an access mode with limited access to a network, and an access mode using a default credential to access a network.

Assuming that the first communications device is an AF, the AF can provide, to the O-SNPN or O-PLMN, onboarding configuration data including a PS address and a corresponding SO-SNPN identifier. The onboarding configuration data is stored in the UDR, and a new data key, for example, an SO-SNPN identifier, or an SO-SNPN group identifier, or an onboarding identifier, is generated.

In this embodiment of this application, providing the first configuration information to the first network is supported, so that the first network can configure the first configuration information for the terminal. The first configuration information includes the address information of the first server, and the terminal can acquire the credential and/or subscription from the first server through the first network. In addition, the information associated with the first configuration information can support filtering of the first configuration information, so that the terminal can acquire the first configuration information really desired by the terminal.

Figure 2:
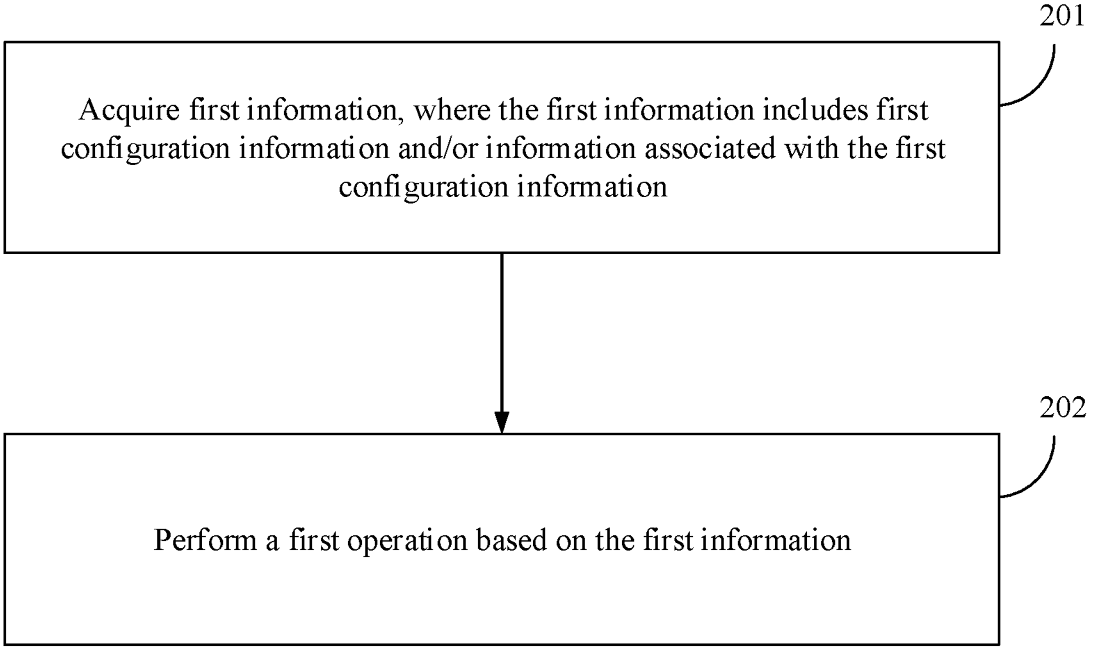
FIG. 2 is a second schematic diagram of a method for supporting information acquisition according to an embodiment of this application.

Referring to FIG. 2, an embodiment of this application provides a method for supporting information acquisition. The method is performed by a second communications device. The second communications device includes but is not limited to one of the following: a core network element (for example, a UDM, a UDR, an AMF, an SMF, and a PCF). Specific steps include:

Step 201: Acquire first information, where the first information includes first configuration information and/or information associated with the first configuration information.

Step 202: Perform a first operation based on the first information.

In an optional embodiment of this application, the first operation includes at least one of the following:

(1) saving the first information;

(2) generating index information (for example, a data key) of the first configuration information for the first configuration information, where the index information of the first configuration information is one or more items of the information associated with the first configuration information;

(3) generating index information (for example, a data key) of a first server for address information of the first server, where the index information of the address information of the first server is one or more items of information associated with the first server;

(4) acquiring first request information, and querying or receiving subscribed first configuration information based on the first request information, where in an implementation, the first request information is used to request the first configuration information (including the address information of the first server); and in an implementation, the first request is a first subscription request for subscribing to the first configuration information (for example, the address information of the first server);

(5) sending the queried or subscribed first configuration information and/or information associated with the first configuration information;

(6) acquiring slice information of a terminal and/or DN information of a terminal, and confirming, based on the slice information of the terminal and/or the DN information of the terminal, first configuration information associated with the slice information of the terminal and/or the DN information of the terminal;

(7) sending the first configuration information and/or the information associated with the first configuration information, where the first configuration information is the first configuration information associated with the slice information of the terminal and/or the DN information of the terminal;

(8) selecting a first target end and/or selecting a data channel of the terminal;

(9) sending the first information to the first target end and/or sending the first information by using related signaling of the data channel of the terminal; and

(10) setting a priority of the first information to be higher than a priority of policy information related to a data operation.

Optionally, when the queried or subscribed first configuration information is sent, the information associated with the first configuration information is also sent.

In an implementation, acquiring the first request information occurs before acquiring the first information, and the requested first configuration information is sent after the first information is acquired. In an implementation, in a case that the first configuration information is changed, the subscribed first configuration information is sent.

In an implementation, the queried or subscribed first configuration information is sent to a communications device that sends the first request information. Optionally, the information associated with the first configuration information may also be sent to the communications device that sends the first request information.

In an optional embodiment of this application, the first configuration information includes the address information of the first server, where the first server is capable of configuring a credential and/or subscription of a first object for the terminal.

The information associated with the first configuration information includes at least one of the following:

(1) identification information of the first object;

(2) group identification information of a network group to which the first object belongs;

(3) slice information associated with the first object;

(4) DN information associated with the first object;

(5) identification information of a network to which the first server belongs;

(6) group identification information of a network group to which the first server belongs;

(7) type information of the credential and/or subscription;

(8) indication information for indicating a first access mode, where in an optional embodiment of this application, the first object includes at least one of the following: a network A, an entity in a data network, an entity outside the first network, primary authentication and/or authorization, non-primary authentication and/or authorization, slice information, DN information, an object associated with primary authentication and/or authorization, and an object associated with non-primary authentication and/or authorization;

(9) slice information associated with the first configuration information; and

(10) DN information associated with the first configuration information, where the network A is the same as or different from the first network;

and/or the type information of the credential and/or subscription includes at least one of the following: a credential and/or subscription used for primary authentication and/or authorization, and a credential and/or subscription used for non-primary authentication and/or authorization;

and/or the terminal accessing the first network accesses the first network in the first access mode;

and/or the first server includes at least one of the following: a first server used for primary authentication and/or authorization configuration, and a first server used for non-primary authentication and/or authorization configuration, where the first server used for primary authentication and/or authorization configuration is capable of configuring the credential and/or subscription of the first object for the terminal, and the credential and/or subscription is used for primary authentication and/or authorization; and the first server used for non-primary authentication and/or authorization configuration is capable of configuring the credential and/or subscription of the first object for the terminal, and the credential and/or subscription is used for non-primary authentication and/or authorization.

In an optional embodiment of this application, a network type of the first network and/or a network type of the network A include/includes at least one of the following: a public network, a non-public network, a PLMN, a PNI NPN, and an SNPN.

In an implementation, the slice information includes slice information of the terminal.

In an implementation, the DN information includes DN information of the terminal.

In an implementation, the slice information of the terminal includes at least one of the following: slice information requested by the terminal, slice information allowed for the terminal, slice information subscribed to by the terminal, and slice information configured for the terminal.

In an implementation, the slice information requested by the terminal includes at least one of the following: slice information requested by the terminal when the terminal establishes a session; and slice information requested by the terminal when the terminal registers with the network.

In an implementation, the DN information of the terminal includes at least one of the following: DN information requested by the terminal, DN information allowed for the terminal, DN information subscribed to by the terminal, and DN information configured for the terminal.

In an implementation, the DN information requested by the terminal includes at least one of the following: DN information requested by the terminal when the terminal establishes a session; and DN information requested by the terminal when the terminal registers with the network.

It is not difficult to understand that non-primary authentication (for example, secondary authentication and slice authentication) is associated with the slice of the terminal and/or the DN information of the terminal. In a case that the corresponding first server for downloading the credential for non-primary authentication needs to be configured for the terminal, association can be performed by using the slice information of the terminal and/or the DN information of the terminal.

In an implementation, the sending the first configuration information and/or the information associated with the first configuration information includes: sending the first configuration information and/or the information associated with the first configuration information to the terminal.

In an implementation, the first request information is acquired, and the subscribed first configuration information is queried or received based on the first request information.

In another implementation, the slice information of the terminal and/or the DN information of the terminal (for example, slice information subscribed to by the terminal and/or DN information subscribed to by the terminal) is acquired, and first configuration information associated with the slice information of the terminal and/or the DN information of the terminal is confirmed based on the slice information of the terminal and/or the DN information of the terminal.

In an optional embodiment of this application, the address information of the first server includes at least one of the following: an Internet Protocol address of the first server, a media access control address of the first server, a port number of the first server, a protocol type for configuring the credential and/or subscription, a protocol version of the first server, and address index information of the first server.

In an optional embodiment of this application, the address index information of the first server includes at least one of the following: an FQDN of the first server and a URL of the first server.

In an optional embodiment of this application, the first access mode includes at least one of the following:

an access mode for accessing a network to acquire a credential and/or subscription, an access mode with limited access to a network, and an access mode using a default credential to access a network.

In an optional embodiment of this application, the first request information includes at least one of the following:

(1) the indication information for indicating the first access mode;

(2) the type information of the credential and/or subscription;

(3) identification information of a second object;

(4) group identification information of a network group to which the second object belongs;

(5) identification information of a second network, where in an implementation, the identification information of the second network may be used to map configuration information of the first access mode corresponding to the second network (including the address information of the first server);

(6) group identification information of a second network group;

(7) slice information associated with the second object;

(8) DN information associated with the second object;

(9) the slice information of the terminal; and

(10) the DN information of the terminal.

The second network group is a network group to which the second network belongs.

In an implementation, the second object includes at least one of the following: a network A, an entity in a data network, an entity outside the first network, primary authentication and/or authorization, non-primary authentication and/or authorization, slice information, DN information, an object associated with primary authentication and/or authorization, and an object associated with non-primary authentication and/or authorization.

The type information of the credential and/or subscription includes at least one of the following: a credential and/or subscription used for primary authentication and/or authorization, and a credential and/or subscription used for non-primary authentication and/or authorization.

In an optional embodiment of this application, in a case that the first operation includes acquiring first request information, and querying or receiving subscribed first configuration information based on the first request information, the operation of querying or receiving subscribed first configuration information based on the first request information includes at least one of the following:

the identification information of the first object included in the index information of the queried or subscribed first configuration information matches identification information of a second object in the first request information;

the group identification information of the network group to which the first object belongs, included in the index information of the queried or subscribed first configuration information, matches group identification information of a second network group in the first request information;

the slice information associated with the first object included in the index information of the queried or subscribed first configuration information matches slice information in the first request information;

the DN information associated with the first object included in the index information of the queried or subscribed first configuration information matches DN information in the first request information;

identification information of a network A included in the index information of the queried or subscribed first configuration information matches identification information of a second network in the first request information;

group identification information of a network group to which the network A belongs, included in the index information of the queried or subscribed first configuration information, matches the identification information of the second network in the first request information;

the identification information of the network to which the first server belongs, included in the index information of the queried first configuration information, matches the identification information of the second network in the first request information;

the group identification information of the network group to which the first server belongs, included in the index information of the queried or subscribed first configuration information, matches the group identification information of the second network group in the first request information;

the index information of the queried first configuration information includes the first access mode, and the first request information includes the indication information for indicating the first access mode;

the index information of the queried or subscribed first configuration information includes a credential and/or subscription used for primary authentication and/or authorization, and the first request information includes a credential and/or subscription used for primary authentication and/or authorization; and the index information of the queried or subscribed first configuration information includes a credential and/or subscription used for non-primary authentication and/or authorization, and the first request information includes a credential and/or subscription used for non-primary authentication and/or authorization.

In an optional embodiment of this application, the first access mode includes at least one of the following:

an access mode for accessing a network to acquire a credential and/or subscription, an access mode with limited access to a network, and an access mode using a default credential to access a network.

The step of sending the first configuration information and/or the information associated with the first configuration information includes: in a case that a second condition is met, sending the first configuration information and/or the information associated with the first configuration information, where the second condition includes at least one of the following:

the terminal registers with or accesses the first network; and the first configuration information and/or the information associated with the first configuration information is generated or updated.

Optionally, the operation of setting a priority of the first information to be higher than a priority of policy information related to a data operation includes: in a case that a third condition is met, setting the priority of the first information to be higher than the priority of the policy information related to the data operation, where the third condition includes at least one of the following:

the first information is first information acquired through reception; and the first information is not locally configured first information.

In an implementation, in a case that the second communications device is a communications network element responsible for session management, that the first information is first information acquired through reception includes that the first information is first information acquired through reception from a communications network element responsible for mobility management.

In an implementation, in a case that the second communications device is a communications network element responsible for policy control, that the first information is first information acquired through reception includes that the first information is first information acquired through reception from a communications network element responsible for session management or a communications network element responsible for mobility management.

Optionally, the first target end includes at least one of the following: a communications network element responsible for session management and a communications network element responsible for policy control.

In an implementation, in a case that the second communications device is a communications network element responsible for mobility management, the first target end includes the communications network element responsible for session management and/or the communications network element responsible for policy control.

In another implementation, in a case that the second communications device is a communications network element responsible for mobility management, the first target end includes the communications network element responsible for policy control.

Optionally, the step of sending the first information to the first target end and/or sending the first information by using related signaling of the data channel of the terminal includes:

in a case that a fourth condition is met, sending the first information to the first target end and/or sending the first information by using the related signaling of the data channel of the terminal, where the fourth condition includes at least one of the following:

DN information of the data channel of the terminal includes at least one of the following: DN information used for the first access mode, the DN information associated with the first object, and the DN information associated with the first configuration information;

slice information of the data channel of the terminal includes at least one of the following: slice information used for the first access mode, the slice information associated with the first object, and the slice information associated with the first configuration information;

DN information of the data channel of the terminal that the first target end is responsible for or associated with includes at least one of the following: DN information used for the first access mode, the DN information associated with the first object, and the DN information associated with the first configuration information;

slice information of the data channel of the terminal that the first target end is responsible for or associated with includes at least one of the following: slice information used for the first access mode, the slice information associated with the first object, and the slice information associated with the first configuration information;

the terminal is in the first access mode;

the first information is first information acquired through reception; and the first information is not locally configured first information.

In an implementation, based on the first information, the communications network element responsible for policy control (for example, a PCF) sets policy information (for example, a PCC rule) related to the data operation.

In an implementation, the communications network element responsible for session management (for example, an SMF) performs at least one of the following based on the first information: setting data operation rules (for example, N4 rules such as packet detection rules (PDR) and forwarding action rules (FAR)), and sending the first information to the terminal.

Optionally, the data operation rules and/or data operation related policy information may be used to restrict data (for example, except data related to the first server and/or data related to domain name system (DNS) queries) or allow data (for example, data related to the first server and/or data related to DNS queries) to pass. The data related to the first server may include: a data source and/or data whose data target is the first server.

Optionally, the data operation includes at least one of the following: buffering, discarding, passing, forwarding, filtering, and the like.

In an implementation, the first target end may be selected and/or the data channel (for example, a PDU session) of the terminal may be selected based on the slice information associated with the first configuration information and/or the DN information associated with the first configuration information in the first information. It is not difficult to understand that in a PNI SNPN or O-PLMN scenario, the terminal is registered normally and is not in the first access mode. In this case, a plurality of data channels may exist on the terminal, and may correspond to a plurality of SMFs or a plurality of PCFs. In this case, a data channel and an SMF need to be selected.

In an implementation, signaling related to the data channel of the terminal is, for example, PDU session related signaling (such as PDU Session Establishment), or session management (SM) association related signaling (such as SM Policy Association Establishment).

It is not difficult to understand that in an existing definition, a priority of a PCC rule is higher than a priority of first information stored locally in an SMF or higher than a priority of a data operation rule that is set based on locally stored first information. Because externally acquired first information is latest and should have a higher priority, if the PCF still sets the PCC rule based on the locally configured first information, on a basis that the priority of the existing PCC rule is higher than the priority of the first information stored locally in the SMF, an error occurs when the SMF sets the data operation rule according to the PCC rule. Therefore, one solution idea is to send the latest first information to the PCF or to set the priority of the received acquired first information to be higher than the priority of the PCC rule.

In an implementation, concepts of local storage and local configuration may be used interchangeably.

In this embodiment of this application, querying or subscribing to the first configuration information is supported, so that the first network can configure the first configuration information for the terminal. The first configuration information includes the address information of the first server, and the terminal can acquire the credential and/or subscription from the first server through the first network. In addition, the information associated with the first configuration information can support filtering of the first configuration information, so that the terminal can acquire the first configuration information really desired by the terminal.

Figure 3:
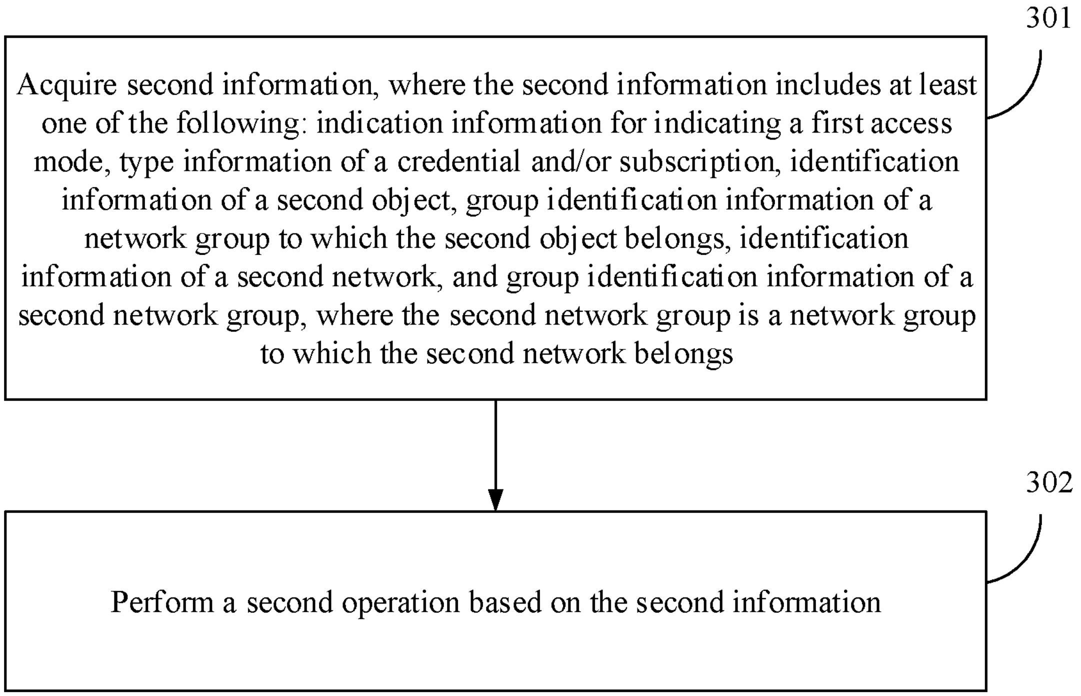
FIG. 3 is a third schematic diagram of a method for supporting information acquisition according to an embodiment of this application.

Referring to FIG. 3, an embodiment of this application provides a method for supporting information acquisition. The method is performed by a third communications device. The third communications device includes but is not limited to one of the following: a registration management network element (for example, an AMF), a policy control network element (for example, a PCF), a session management network element (for example, a session management function (SMF)), and a core network element. Specific steps include:

Step 301: Acquire second information, where the second information includes at least one of the following: indication information for indicating a first access mode, type information of a credential and/or subscription, identification information of a second object, group identification information of a network group to which the second object belongs, slice information associated with the second object, DN information associated with the second object, identification information of a second network, group identification information of a second network group, where the second network group is a network group to which the second network belongs, slice information of a terminal, DN information of the terminal, connection establishment request information, registration request information, and data channel establishment request information.

Step 302: Perform a second operation based on the second information.

The second operation includes at least one of the following:

(1) selecting or querying a target communications device based on the second information, where optionally, the target communications device includes but is not limited to one of the following: a PCF, a UDM, and a UDR;

(2) sending first request information to the target communications device; and (3) sending the second information, where the type information of the credential and/or subscription includes at least one of the following: a credential and/or subscription used for primary authentication and/or authorization, and a credential and/or subscription used for non-primary authentication and/or authorization.

In an implementation, information about the target communications device that matches one or more items of the second information is configured on the third communications device. In another implementation, information about the target communications device is configured on a fourth communications device.

Optionally, sending the second information includes: sending the second information to a session management network element (for example, an SMF). In an implementation, the second information may be sent when session management related signaling sent by the terminal is forwarded to the session management network element. In this case, the third communications device may be a registration management network element.

In an optional embodiment of this application, the step of querying a target communications device based on the second information includes:

sending network element query information to a fourth communications device, where the network element query information includes the second information; and receiving information that is about the target communications device and sent by the fourth communications device.

Optionally, the fourth communications device is a network repository function (NRF).

In an optional embodiment of this application, the first request information includes at least one of the following: the indication information for indicating the first access mode, the type information of the credential and/or subscription, the identification information of the second object, the group identification information of the network group to which the second object belongs, the identification information of the second network, the group identification information of the second network group, the slice information associated with the second object, the DN information associated with the second object, the slice information of the terminal, and the DN information of the terminal.

In an implementation, the second object includes at least one of the following: a network A, an entity in a data network, an entity outside a first network, primary authentication and/or authorization, non-primary authentication and/or authorization, slice information, DN information, an object associated with primary authentication and/or authorization, and an object associated with non-primary authentication and/or authorization.

In an implementation, the slice information of the terminal includes at least one of the following: slice information requested by the terminal, slice information allowed for the terminal, slice information subscribed to by the terminal, and slice information configured for the terminal.

In an implementation, the slice information requested by the terminal includes at least one of the following: slice information requested by the terminal when the terminal establishes a session; and slice information requested by the terminal when the terminal registers with the network.

In an implementation, the DN information of the terminal includes at least one of the following: DN information requested by the terminal, DN information allowed for the terminal, DN information subscribed to by the terminal, and DN information configured for the terminal.

In an implementation, the DN information requested by the terminal includes at least one of the following: DN information requested by the terminal when the terminal establishes a session; and DN information requested by the terminal when the terminal registers with the network.

It is not difficult to understand that non-primary authentication (for example, secondary authentication and slice authentication) is associated with the slice of the terminal and/or the DN information of the terminal. In a case that a corresponding first server for downloading the credential for non-primary authentication needs to be configured for the terminal, association can be performed by using the slice information of the terminal and/or the DN information of the terminal.

In an implementation, the slice information of the terminal and/or the DN information of the terminal may be acquired from the terminal. For example, the slice information of the terminal may be acquired from registration request information (including a registration request message). The registration request message may include slice information requested by the terminal. For another example, the slice information of the terminal and/or the DN information of the terminal may be acquired from data channel establishment request information (including a data channel establishment request message).

In another implementation, the slice information of the terminal and/or the DN information of the terminal may be acquired from subscription data of the terminal.

The data channel establishment request information (for example, a PDU session) includes slice information requested by the terminal, and DN information requested by the terminal.

In an implementation, the terminal establishes a connection to the network by using a connection establishment request message.

It is not difficult to understand that non-primary authentication (for example, secondary authentication and slice authentication) is associated with the slice of the terminal and/or the DN information of the terminal. In a case that a corresponding first server for downloading the credential for non-primary authentication needs to be configured for the terminal, association can be performed by using the slice information of the terminal and/or the DN information of the terminal.

In an optional embodiment of this application, the first access mode includes at least one of the following:

an access mode for accessing a network to acquire a credential and/or subscription, an access mode with limited access to a network, and an access mode using a default credential to access a network.

In this embodiment of this application, acquisition of the second information sent by the terminal is supported, and the first request information is determined for the terminal to query or subscribe to first configuration information, so that the first network can configure the first configuration information for the terminal. The first configuration information includes address information of the first server, and the terminal can acquire the credential and/or subscription from the first server through the first network. In addition, the information associated with the first configuration information can support filtering of the first configuration information, so that the terminal can acquire the first configuration information really desired by the terminal.

Figure 4:
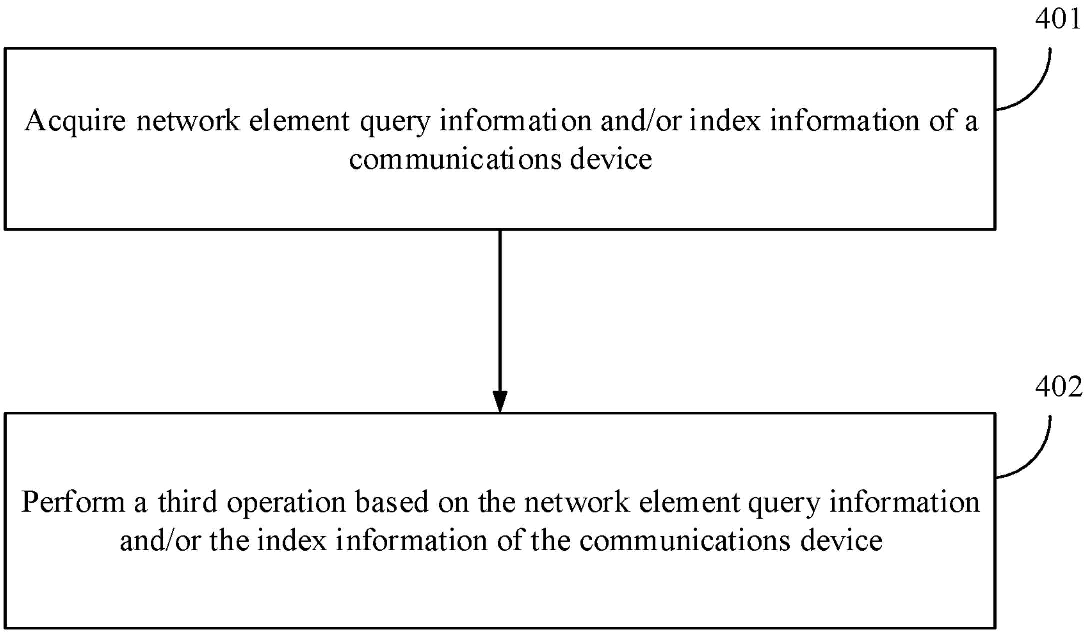
FIG. 4 is a fourth schematic diagram of a method for supporting information acquisition according to an embodiment of this application.

Referring to FIG. 4, an embodiment of this application provides a method for supporting information acquisition. The method is performed by a fourth communications device. The fourth communications device includes but is not limited to one of the following: an NRF, and a core network element. Specific steps include:

Step 401: Acquire network element query information and/or index information of a communications device.

The network element query information includes at least one of the following: indication information for indicating a first access mode, type information of a credential and/or subscription, identification information of a second object, group identification information of a network group to which the second object belongs, identification information of a second network, group identification information of a second network group, where the second network group is a network group to which the second network belongs, slice information, and DN information.

Step 402: Perform a third operation based on the network element query information and/or the index information of the communications device.

The third operation includes at least one of the following:

(1) matching a target communications device based on the network element query information; and (2) sending information about the target communications device.

In an implementation, the information about the target communications device is sent to a communications device that sends the network element query information.

In an optional embodiment of this application, the index information of the target communications device matches the network element query information.

In an optional embodiment of this application, that the index information of the target communications device matches the network element query information includes at least one of the following:

the index information of the target communications device includes the indication information for indicating the first access mode, and the network element query information includes the indication information for indicating the first access mode;

the index information of the target communications device includes the identification information of the second object, and the network element query information includes the identification information of the second object;

the index information of the target communications device includes the group identification information of the network group to which the second object belongs, and the network element query information includes the group identification information of the network group to which the second object belongs;

the index information of the target communications device includes a credential and/or subscription used for primary authentication and/or authorization, and the network element query information includes a credential and/or subscription used for primary authentication and/or authorization;

the index information of the target communications device includes a credential and/or subscription used for non-primary authentication and/or authorization, and the network element query information includes a credential and/or subscription used for non-primary authentication and/or authorization;

the index information of the target communications device includes the identification information of the second network, and the network element query information includes the identification information of the second network;

the index information of the target communications device includes the group identification information of the second network group, and the network element query information includes the group identification information of the second network group;

the index information of the target communications device includes the slice information, and the network element query information includes the slice information; and the index information of the target communications device includes the DN information, and the network element query information includes the DN information.

In an optional embodiment of this application, the acquiring index information of a communications device includes:

acquiring network element registration information; and generating the index information of the communications device based on the network element registration information, where the network element registration information includes at least one of the following: the indication information for indicating the first access mode, the type information of the credential and/or subscription, identification information of a third object, group identification information of a network group to which the third object belongs, identification information of a third network, and group identification information of a third network group; and the index information of the communications device includes one or more items of the network element registration information.

Optionally, the network element or a communications device sending the network element registration information serves the third object.

In an optional embodiment of this application, the first access mode includes at least one of the following:

an access mode for accessing a network to acquire a credential and/or subscription, an access mode with limited access to a network, and an access mode using a default credential to access a network.

In this embodiment of this application, network element registration of the core network element serving the third object and/or in the first access mode is supported, so that the core network element serving the third object and/or in the first access mode can be selected for the terminal.

Figure 5:
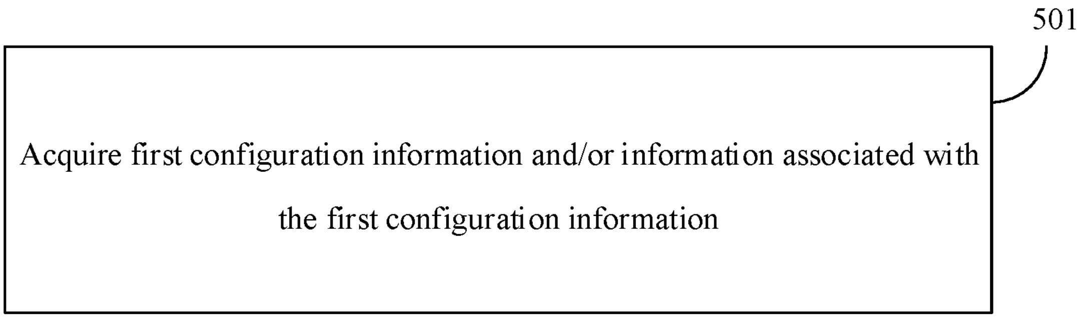
FIG. 5 is a fifth schematic diagram of a method for supporting information acquisition according to an embodiment of this application.

Referring to FIG. 5, an embodiment of this application provides a method for supporting information acquisition. The method is performed by a fifth communications apparatus. The fifth communications apparatus includes but is not limited to a terminal. A specific step includes:

Step 501: Acquire first configuration information and/or information associated with the first configuration information.

Before the step of acquiring first configuration information and/or information associated with the first configuration information, the method further includes: sending second information, where the second information includes at least one of the following: indication information for indicating a first access mode, type information of a credential and/or subscription, identification information of a second object, group identification information of a network group to which the second object belongs, slice information associated with the second object, DN information associated with the second object, identification information of a second network, group identification information of a second network group, where the second network group is a network group to which the second network belongs, slice information of a terminal, DN information of the terminal, connection establishment request information, registration request information, or data channel establishment request information.

In an implementation, the registration request information (including a registration request message) includes slice information requested by the terminal.

In an implementation, the data channel (for example, PDU session) establishment request information (including a data channel establishment request message) includes at least one of the following: slice information requested by the terminal, and DN information requested by the terminal.

In an implementation, the terminal establishes a connection to the network by using connection establishment request information (for example, a connection establishment request message, or a service request message).

It is not difficult to understand that non-primary authentication (for example, secondary authentication and slice authentication) is associated with the slice of the terminal and/or the DN information of the terminal. In a case that a corresponding first server for downloading the credential for non-primary authentication needs to be configured for the terminal, association can be performed by using the slice information of the terminal and/or the DN information of the terminal.

In an implementation, when the first configuration information includes address information of a plurality of first servers, acquiring the first configuration information and the information associated with the first configuration information can help the terminal confirm which association information is associated with each first server. For example, a first server A is associated with a slice A and a second server B is associated with a slice B.

In an optional embodiment of this application, the step of sending second information includes:

in a case that a first condition is met, sending the second information, where the first condition includes at least one of the following:

(1) the terminal supports acquisition of a credential and/or subscription of a network in a user-plane mode;

(2) the terminal acquires the credential and/or subscription of the network in the user-plane mode;

(3) the terminal needs to acquire a credential and/or subscription used for primary authentication and/or authorization;

(4) the terminal needs to acquire a credential and/or subscription used for non-primary authentication and/or authorization;

(5) the terminal needs to acquire a credential and/or subscription of the second network or the second object; and (6) the terminal does not have address information of a first server corresponding to the second network or the second object.

In an implementation, the second object includes at least one of the following: a network A, an entity in a data network, an entity outside a first network, primary authentication and/or authorization, non-primary authentication and/or authorization, slice information, DN information, an object associated with primary authentication and/or authorization, and an object associated with non-primary authentication and/or authorization.

Optionally, after the acquiring first configuration information and/or information associated with the first configuration information, the method further includes:

the terminal may perform at least one of the following based on the first configuration information and/or the information associated with the first configuration information:

establishing a first data channel; and requesting to acquire a credential and/or subscription from a first server, where the first data channel may be used for interaction between the terminal and the first server.

In an implementation, the credential and/or subscription may be a credential and/or subscription of a first object in the information associated with the first configuration information.

The first configuration information includes address information of a first server, and the first server is capable of configuring a credential and/or subscription of a first object for the terminal;

and/or the information associated with the first configuration information includes at least one of the following:

identification information of the first object;

group identification information of a network group to which the first object belongs;

slice information associated with the first object;

DN information associated with the first object;

identification information of a network to which the first server belongs;

group identification information of a network group to which the first server belongs;

type information of the credential and/or subscription;

indication information for indicating a first access mode;

slice information associated with the first configuration information; and

DN information associated with the first configuration information.

In an implementation, the second object is the same as the first object.

In another implementation, the second object is a subset of the first object.

In another implementation, the first object is a subset of the second object.

In this embodiment of this application, acquisition of the first configuration information by the terminal is supported, where the first configuration information includes the address information of the first server, and the terminal can acquire the credential and/or subscription from the first server through the first network. In addition, the terminal can further provide the second information, and can support filtering of the first configuration information, so that the terminal can acquire the first configuration information really desired by the terminal.

Figure 6:
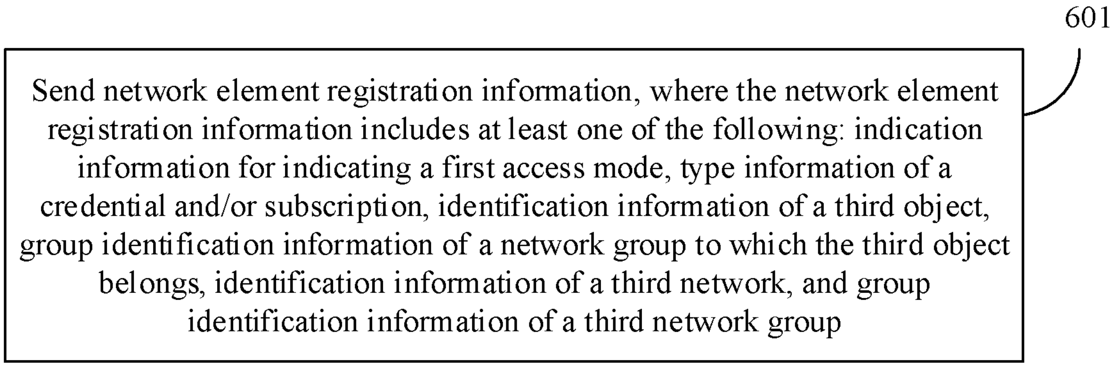
FIG. 6 is a sixth schematic diagram of a method for supporting information acquisition according to an embodiment of this application.

Referring to FIG. 6, an embodiment of this application provides a method for supporting information acquisition. The method is performed by a sixth communications device. The sixth communications device includes but is not limited to one of the following: a core network element (for example, a UDR, a UDM, or a PCF). A specific step includes:

Step 601: Send network element registration information, where the network element registration information includes at least one of the following: indication information for indicating a first access mode, type information of a credential and/or subscription, identification information of a third object, group identification information of a network group to which the third object belongs, identification information of a third network, and group identification information of a third network group.

In an optional embodiment of this application, the indication information for indicating the first access mode indicates that the sixth communications device is used for a terminal that accesses a network in the first access mode or used for the first access mode;

and/or the type information of the credential and/or subscription indicates that the sixth communications device is configured to provide at least one of the following: configuration information related to primary authentication and/or authorization, and configuration information related to non-primary authentication and/or authorization;

and/or the identification information of the third object indicates that the sixth communications device is configured to serve the third object or configured to provide configuration information related to the third object;

and/or the group identification information of the network group to which the third object belongs indicates that the sixth communications device is configured to serve an object in the network group or configured to provide configuration information related to an object in the network group;

and/or the identification information of the third network indicates that the sixth communications device is configured to serve the third network or configured to provide configuration information related to the third network;

and/or the group identification information of the third network group indicates that the sixth communications device is configured to serve a network in the network group or configured to provide configuration information related to a network in the network group.

In this embodiment of this application, network element registration of a core network element serving the first object and/or in the first access mode is supported, so that the core network element serving the first object and/or in the first access mode can be selected for the terminal.

Referring to FIG. 7-A, specific steps are as follows:

Step 1: UE sends a registration request (optionally, including second information) to an AMF.

For the description of step 1, refer to the embodiment shown in FIG. 5.

Step 2: The AMF sends a policy association establishment request (optionally, including second information) to a PCF.

Optionally, the PCF is a PCF that matches one or more items of the second information. The AMF selects a PCF or queries an NRF for a PCF based on the second information.

Step 3: The PCF sends an information subscription request (optionally, including first request information) to a UDR.

Optionally, the UDR is a UDR that matches one or more items of the second information. The AMF selects a UDR or queries the NRF for a UDR based on the second information.

For the description of step 2 and step 3, refer to the embodiment shown in FIG. 3.

Step 4: An AF sends a service parameter configuration creation request or a service parameter configuration modification request (optionally, including the first information) to an NEF.

Step 5: The NEF sends the service parameter configuration creation request or service parameter configuration modification request (optionally, including the first information) to the UDR.

For the description of step 4 and step 5, refer to the embodiment shown in FIG. 1.

Step 6: The UDR sends a service parameter configuration creation response or a service parameter configuration modification response (first information) to the AF through the NEF.

Step 7: The UDR sends an information notification message (for example, Nudr_DM_Notify) to the PCF, where the information notification message includes first configuration information, and the notification message may further include information associated with the first configuration information.

For the description of step 6 and step 7, refer to the embodiment shown in FIG. 2.

Step 8: The PCF sends a UE policy (optionally including the first configuration information, and/or the information associated with the first configuration information) to the UE through the AMF.

For the description of step 8, refer to the embodiment shown in FIG. 3.

Step 9: Based on the first configuration information and/or the information associated with the first configuration information, the UE may perform one of the following: establishing a first data channel, and requesting to acquire a credential and/or subscription from a first server. The first data channel may be used for interaction between the terminal and the first server. For step 9, refer to the embodiment in FIG. 5.

It may be understood that there is no sequence relationship between steps 1 to 3 and steps 4 to 7. Steps 1 to 3 may be performed in parallel with steps 4 to 7, or steps 4 to 7 are performed before steps 1 to 3, or steps 1 to 3 are performed before steps 4 and 5.

Referring to FIG. 7-B, specific steps are as follows:

Step 1: UE sends a PDU session establishment request to an SMF through an AMF. The PDU session establishment request is included in a first message (for example, an N1N2 transfer message) sent by the AMF to the SMF.

In an implementation, the PDU session establishment request includes second information.

In another implementation, the first message includes the second information. In this case, the AMF acquires the second information in a registration request of the UE.

Step 2: The SMF sends a policy association establishment request (optionally, including the second information) to a PCF through the AMF.

Optionally, the PCF is a PCF that matches one or more items of the second information. The AMF selects a PCF or queries an NRF for a PCF based on the second information.

Step 3: The SMF sends an information subscription request (optionally, including first request information) to a UDR.

Optionally, the UDR is a UDR that matches one or more items of the second information. The AMF selects a UDR or queries the NRF for a UDR based on the second information.

For the description of steps 1 to 3, refer to the embodiment shown in FIG. 3.

Steps 4 to 7 are consistent with steps 4 to 7 in FIG. 7-A and are not described herein again.

Step 8: The SMF sends session management related signaling (optionally, including first configuration information, and/or information associated with the first configuration information) to the UE through the AMF. The first configuration information, and/or the information associated with the first configuration information may be sent by using protocol configuration option (PCO) information.

For the description of step 8, refer to the embodiment shown in FIG. 3.

Step 9: Based on the first configuration information, the UE may perform one of the following: establishing a first data channel, and requesting to acquire a credential and/or subscription from a first server. The first data channel may be used for interaction between the terminal and the first server. For step 9, refer to the embodiment in FIG. 5.

There is no sequence relationship between steps 1 to 3 and steps 4 to 7. Steps 1 to 3 may be performed in parallel with steps 4 to 7, or steps 4 to 7 are performed before steps 1 to 3, or steps 1 to 3 are performed before steps 4 and 5.

Figure 8:
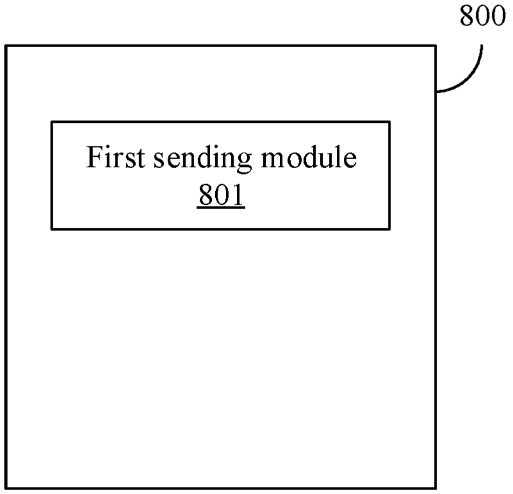
FIG. 8 is a first schematic diagram of an apparatus for supporting information acquisition according to an embodiment of this application.

Referring to FIG. 8, an embodiment of this application provides an apparatus for supporting information acquisition. The apparatus is applied to a first communications device. The apparatus 800 includes:

a first sending module 801, configured to send first information to a first network, where the first information includes first configuration information and/or information associated with the first configuration information, where the first configuration information includes address information of a first server, where the first server is capable of configuring a credential and/or subscription of a first object for a terminal; and the information associated with the first configuration information includes at least one of the following:

identification information of the first object;

group identification information of a network group to which the first object belongs;

slice information associated with the first object;

DN information associated with the first object;

identification information of a network to which the first server belongs;

group identification information of a network group to which the first server belongs;

type information of the credential and/or subscription;

slice information associated with the first configuration information;

DN information associated with the first configuration information; and indication information for indicating a first access mode.

In an optional embodiment of this application, the first object includes at least one of the following: a network A, an entity in a data network, an entity outside the first network, primary authentication and/or authorization, non-primary authentication and/or authorization, slice information, DN information, an object associated with primary authentication and/or authorization, and an object associated with non-primary authentication and/or authorization, where the network A is the same as or different from the first network;

and/or the type information of the credential and/or subscription includes at least one of the following: a credential and/or subscription used for primary authentication and/or authorization, and a credential and/or subscription used for non-primary authentication and/or authorization;

and/or the indication information for indicating the first access mode indicates one of the following: the first configuration service information is used for the terminal that accesses the first network in the first access mode, and the first server is capable of configuring the credential and/or subscription of the first object for the terminal that accesses the first network in the first access mode;

and/or the terminal accessing the first network accesses the first network in the first access mode;

and/or the first server includes at least one of the following: a first server used for primary authentication and/or authorization configuration, and a first server used for non-primary authentication and/or authorization configuration, where the first server used for primary authentication and/or authorization configuration is capable of configuring the credential and/or subscription of the first object for the terminal, and the credential and/or subscription is used for primary authentication and/or authorization; and the first server used for non-primary authentication and/or authorization configuration is capable of configuring the credential and/or subscription of the first object for the terminal, and the credential and/or subscription is used for non-primary authentication and/or authorization.

In an optional embodiment of this application, a network type of the first network, a network accessed by the terminal, and/or a network type of the network A include/includes at least one of the following: a public network, a non-public network, a PLMN, a PNI NPN, and a standalone non-public network SNPN.

In an optional embodiment of this application, the address information of the first server includes at least one of the following: an Internet Protocol address of the first server, a media access control address of the first server, a port number of the first server, a protocol version of the first server, and address index information of the first server.

In an optional embodiment of this application, the address index information of the first server includes at least one of the following: an FQDN of the first server and a URL of the first server.

In an optional embodiment of this application, the first access mode includes at least one of the following:

an access mode for accessing a network to acquire a credential and/or subscription, an access mode with limited access to a network, and an access mode using a default credential to access a network.

The apparatus provided in this embodiment of this application can implement each process implemented by the method embodiment in FIG. 1, with the same technical effect achieved. To avoid repetition, details are not described herein again.

Figure 9:
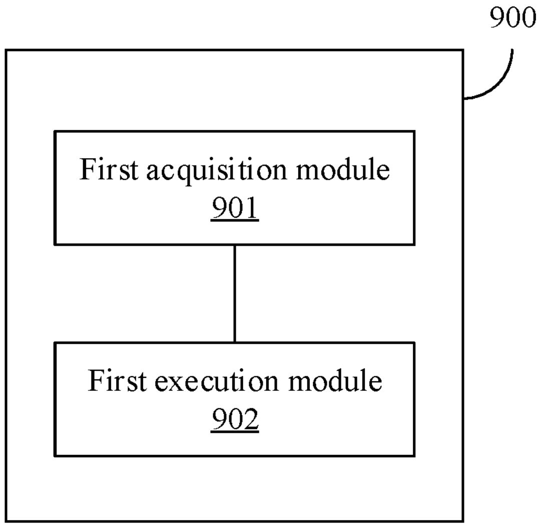
FIG. 9 is a second schematic diagram of an apparatus for supporting information acquisition according to an embodiment of this application.

Referring to FIG. 9, an embodiment of this application provides an apparatus for supporting information acquisition. The apparatus is applied to a second communications device. The apparatus 900 includes:

a first acquisition module 901, configured to acquire first information, where the first information includes first configuration information and/or information associated with the first configuration information; and a first execution module 902, configured to perform a first operation based on the first information, where the first operation includes at least one of the following:

saving the first information;

generating index information (for example, a data key) of the first configuration information for the first configuration information, where the index information of the first configuration information is one or more items of the information associated with the first configuration information;

generating index information of a first server for address information of the first server, where the index information of the address information of the first server is one or more items of information associated with the first server;

acquiring first request information, and querying or receiving subscribed first configuration information based on the first request information;

sending the queried or subscribed first configuration information and/or information associated with the first configuration information;

acquiring slice information of a terminal and/or DN information of a terminal, and confirming, based on the slice information of the terminal and/or the DN information of the terminal, first configuration information associated with the slice information of the terminal and/or the DN information of the terminal;

sending the first configuration information and/or the information associated with the first configuration information, where the first configuration information is the first configuration information associated with the slice information of the terminal and/or the DN information of the terminal;

selecting a first target end and/or selecting a data channel of the terminal;

sending the first information to the first target end and/or sending the first information by using related signaling of the data channel of the terminal; and setting a priority of the first information to be higher than a priority of policy information related to a data operation, where the first configuration information includes the address information of the first server, where the first server is capable of configuring a credential and/or subscription of a first object for the terminal; and the information associated with the first configuration information includes at least one of the following:

identification information of the first object;

group identification information of a network group to which the first object belongs;

slice information associated with the first object;

DN information associated with the first object;

identification information of a network to which the first server belongs;

group identification information of a network group to which the first server belongs;

type information of the credential and/or subscription;

slice information associated with the first configuration information;

DN information associated with the first configuration information; and indication information for indicating a first access mode, indicating one of the following: the first configuration service information is used for the terminal that accesses a first network in the first access mode, and the first server is capable of configuring the credential and/or subscription of the first object for the terminal that accesses the first network in the first access mode.

In an optional embodiment of this application, the first object includes at least one of the following: a network A, an entity in a data network, an entity outside the first network, primary authentication and/or authorization, non-primary authentication and/or authorization, slice information, DN information, an object associated with primary authentication and/or authorization, and an object associated with non-primary authentication and/or authorization, where the network A is the same as or different from the first network;

and/or the type information of the credential and/or subscription includes at least one of the following: a credential and/or subscription used for primary authentication and/or authorization, and a credential and/or subscription used for non-primary authentication and/or authorization;

and/or the terminal accessing the first network accesses the first network in the first access mode;

and/or the first server includes at least one of the following: a first server used for primary authentication and/or authorization configuration, and a first server used for non-primary authentication and/or authorization configuration, where the first server used for primary authentication and/or authorization configuration is capable of configuring the credential and/or subscription of the first object for the terminal, and the credential and/or subscription is used for primary authentication and/or authorization; and the first server used for non-primary authentication and/or authorization configuration is capable of configuring the credential and/or subscription of the first object for the terminal, and the credential and/or subscription is used for non-primary authentication and/or authorization.

In an optional embodiment of this application, a network type of the first network and/or a network type of the network A include/includes at least one of the following: a public network, a non-public network, a PLMN, a PNI NPN, and an SNPN.

In an optional embodiment of this application, the address information of the first server includes at least one of the following: an Internet Protocol address of the first server, a media access control address of the first server, a port number of the first server, a protocol type for configuring the credential and/or subscription, a protocol version of the first server, and address index information of the first server.

In an optional embodiment of this application, the address index information of the first server includes at least one of the following: an FQDN of the first server and a URL of the first server.

In an optional embodiment of this application, the first access mode includes at least one of the following:

an access mode for accessing a network to acquire a credential and/or subscription, an access mode with limited access to a network, and an access mode using a default credential to access a network.

In an optional embodiment of this application, the first request information includes at least one of the following:

the indication information for indicating the first access mode;

the type information of the credential and/or subscription;

identification information of a second object;

group identification information of a network group to which the second object belongs;

identification information of a second network;

group identification information of a second network group, where the second network group is a network group to which the second network belongs;

slice information associated with the second object;

DN information associated with the second object;

the slice information of the terminal; and the DN information of the terminal, where the type information of the credential and/or subscription includes at least one of the following: a credential and/or subscription used for primary authentication and/or authorization, and a credential and/or subscription used for non-primary authentication and/or authorization.

In an implementation, the second object includes at least one of the following: a network A, an entity in a data network, an entity outside the first network, primary authentication and/or authorization, non-primary authentication and/or authorization, slice information, DN information, an object associated with primary authentication and/or authorization, and an object associated with non-primary authentication and/or authorization.

In an optional embodiment of this application, in a case that the first operation includes acquiring first request information, and querying first configuration information based on the first request information, the operation of querying or receiving subscribed first configuration information based on the first request information includes at least one of the following:

the identification information of the first object included in the index information of the queried or subscribed first configuration information matches identification information of a second object in the first request information;

the group identification information of the network group to which the first object belongs, included in the index information of the queried or subscribed first configuration information, matches group identification information of a second network group in the first request information;

identification information of a network A included in the index information of the queried or subscribed first configuration information matches identification information of a second network in the first request information;

group identification information of a network group to which the network A belongs, included in the index information of the queried or subscribed first configuration information, matches the identification information of the second network in the first request information;

the identification information of the network to which the first server belongs, included in the index information of the queried first configuration information, matches the identification information of the second network in the first request information;

the group identification information of the network group to which the first server belongs, included in the index information of the queried or subscribed first configuration information, matches the group identification information of the second network group in the first request information;

the index information of the queried first configuration information includes the first access mode, and the first request information includes the indication information for indicating the first access mode;

the index information of the queried or subscribed first configuration information includes a credential and/or subscription used for primary authentication and/or authorization, and the first request information includes a credential and/or subscription used for primary authentication and/or authorization; and the index information of the queried or subscribed first configuration information includes a credential and/or subscription used for non-primary authentication and/or authorization, and the first request information includes a credential and/or subscription used for non-primary authentication and/or authorization.

In an optional embodiment of this application, the first access mode includes at least one of the following:

an access mode for accessing a network to acquire a credential and/or subscription, an access mode with limited access to a network, and an access mode using a default credential to access a network.

The step of sending the first configuration information and/or the information associated with the first configuration information includes: in a case that a second condition is met, sending the first configuration information and/or the information associated with the first configuration information, where the second condition includes at least one of the following:

the terminal registers with or accesses the first network; and the first configuration information and/or the information associated with the first configuration information is generated or updated.

Optionally, the operation of setting a priority of the first information to be higher than a priority of policy information related to a data operation includes: in a case that a third condition is met, setting the priority of the first information to be higher than the priority of the policy information related to the data operation, where the third condition includes at least one of the following:

the first information is first information acquired through reception; and the first information is not locally configured first information.

In an implementation, in a case that the second communications device is a communications network element responsible for session management, that the first information is first information acquired through reception includes that the first information is first information acquired through reception from a communications network element responsible for mobility management.

In an implementation, in a case that the second communications device is a communications network element responsible for policy control, that the first information is first information acquired through reception includes that the first information is first information acquired through reception from a communications network element responsible for session management or a communications network element responsible for mobility management.

Optionally, the first target end includes at least one of the following: a communications network element responsible for session management and a communications network element responsible for policy control.

In an implementation, in a case that the second communications device is a communications network element responsible for mobility management, the first target end includes the communications network element responsible for session management and/or the communications network element responsible for policy control.

In another implementation, in a case that the second communications device is a communications network element responsible for mobility management, the first target end includes the communications network element responsible for policy control.

Optionally, the step of sending the first information to the first target end and/or sending the first information by using related signaling of the data channel of the terminal includes:

in a case that a fourth condition is met, sending the first information to the first target end and/or sending the first information by using the related signaling of the data channel of the terminal, where the fourth condition includes at least one of the following:

DN information of the data channel of the terminal includes at least one of the following: DN information used for the first access mode, the DN information associated with the first object, and the DN information associated with the first configuration information;

slice information of the data channel of the terminal includes at least one of the following: slice information used for the first access mode, the slice information associated with the first object, and the slice information associated with the first configuration information;

DN information of the data channel of the terminal that the first target end is responsible for or associated with includes at least one of the following: DN information used for the first access mode, the DN information associated with the first object, and the DN information associated with the first configuration information;

slice information of the data channel of the terminal that the first target end is responsible for or associated with includes at least one of the following: slice information used for the first access mode, the slice information associated with the first object, and the slice information associated with the first configuration information;

the terminal is in the first access mode;

the first information is first information acquired through reception; and the first information is not locally configured first information.

In an implementation, based on the first information, the communications network element responsible for policy control (for example, a PCF) sets policy information (for example, a PCC rule) related to the data operation.

In an implementation, the communications network element responsible for session management (for example, an SMF) performs at least one of the following based on the first information: setting data operation rules (for example, N4 rules such as PDR and FAR), and sending the first information to the terminal.

Optionally, the data operation rules and/or data operation related policy information may be used to restrict data (for example, except data related to the first server and/or data related to DNS queries) or allow data (for example, data related to the first server and/or data related to DNS queries) to pass. The data related to the first server may include: a data source and/or data whose data target is the first server.

Optionally, the data operation includes at least one of the following: buffering, discarding, passing, forwarding, filtering, and the like.

In an implementation, the first target end may be selected and/or the data channel (for example, a PDU session) of the terminal may be selected based on the slice information associated with the first configuration information and/or the DN information associated with the first configuration information in the first information. It is not difficult to understand that in a PNI SNPN or O-PLMN scenario, the terminal is registered normally and is not in the first access mode. In this case, a plurality of data channels may exist on the terminal, and may correspond to a plurality of SMFs or a plurality of PCFs. In this case, a data channel and an SMF need to be selected.

In an implementation, signaling related to the data channel of the terminal is, for example, PDU session related signaling (such as PDU Session Establishment), or session management association related signaling (such as SM Policy Association Establishment).

It is not difficult to understand that in an existing definition, a priority of a PCC rule is higher than a priority of first information stored locally in an SMF or higher than a priority of a data operation rule that is set based on locally stored first information. Because externally acquired first information is latest and should have a higher priority, if the PCF still sets the PCC rule based on the locally configured first information, on a basis that the priority of the existing PCC rule is higher than the priority of the first information stored locally in the SMF, an error occurs when the SMF sets the data operation rule according to the PCC rule. Therefore, one solution idea is to send the latest first information to the PCF or to set the priority of the received acquired first information to be higher than the priority of the PCC rule.

In an implementation, concepts of local storage and local configuration may be used interchangeably.

The apparatus provided in this embodiment of this application can implement each process implemented by the method embodiment in FIG. 2, with the same technical effect achieved. To avoid repetition, details are not described herein again.

Figure 10:
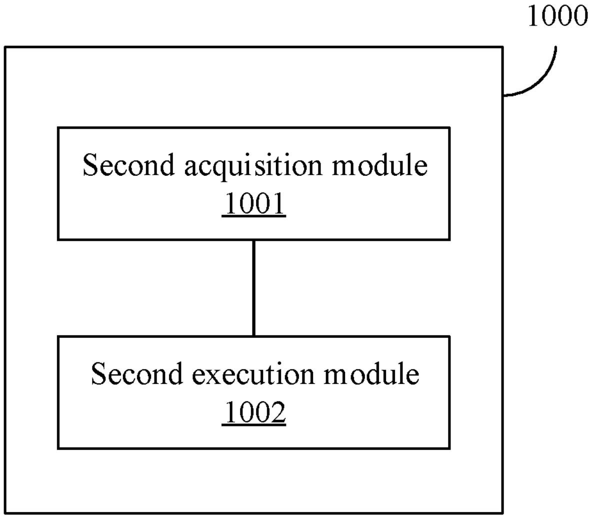
FIG. 10 is a third schematic diagram of an apparatus for supporting information acquisition according to an embodiment of this application.

Referring to FIG. 10, an embodiment of this application provides an apparatus for supporting information acquisition. The apparatus is applied to a third communications device. The apparatus includes:

a second acquisition module 1001, configured to acquire second information, where the second information includes at least one of the following: indication information for indicating a first access mode, type information of a credential and/or subscription, identification information of a second object, group identification information of a network group to which the second object belongs, slice information associated with the second object, DN information associated with the second object, identification information of a second network, group identification information of a second network group, where the second network group is a network group to which the second network belongs, slice information of a terminal, DN information of the terminal, connection establishment request information, registration request information, and data channel establishment request information; and a second execution module 1002, configured to perform a second operation based on the second information, where the second operation includes at least one of the following:

selecting or querying a target communications device based on the second information;

sending first request information to the target communications device; and sending the second information (for example, sending the second information to a session management network element), where the type information of the credential and/or subscription includes at least one of the following: a credential and/or subscription used for primary authentication and/or authorization, and a credential and/or subscription used for non-primary authentication and/or authorization.

In an optional embodiment of this application, the second execution module 1002 is further configured to:

send network element query information to a fourth communications device, where the network element query information includes the second information; and receive information that is about the target communications device and sent by the fourth communications device.

In an optional embodiment of this application, the first request information includes at least one of the following: the indication information for indicating the first access mode, the type information of the credential and/or subscription, the identification information of the second object, the group identification information of the network group to which the second object belongs, the identification information of the second network, the group identification information of the second network group, the slice information associated with the second object, the DN information associated with the second object, the slice information of the terminal, and the DN information of the terminal.

In an implementation, the second object includes at least one of the following: a network A, an entity in a data network, an entity outside a first network, primary authentication and/or authorization, non-primary authentication and/or authorization, slice information, DN information, an object associated with primary authentication and/or authorization, and an object associated with non-primary authentication and/or authorization.

In an optional embodiment of this application, the first access mode includes at least one of the following:

an access mode for accessing a network to acquire a credential and/or subscription, an access mode with limited access to a network, and an access mode using a default credential to access a network.

The apparatus provided in this embodiment of this application can implement each process implemented by the method embodiment in FIG. 3, with the same technical effect achieved. To avoid repetition, details are not described herein again.

Figure 11:
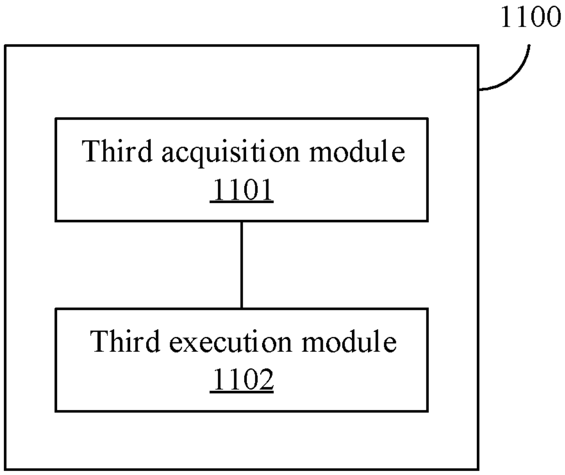
FIG. 11 is a fourth schematic diagram of an apparatus for supporting information acquisition according to an embodiment of this application.

Referring to FIG. 11, an embodiment of this application provides an apparatus for supporting information acquisition. The apparatus is applied to a fourth communications device. The apparatus 1100 includes:

a third acquisition module 1101, configured to acquire network element query information and/or index information of a communications device, where the network element query information includes at least one of the following: indication information for indicating a first access mode, type information of a credential and/or subscription, identification information of a second object, group identification information of a network group to which the second object belongs, identification information of a second network, group identification information of a second network group, where the second network group is a network group to which the second network belongs, slice information, and DN information; and a third execution module 1102, configured to perform a third operation based on the network element query information and/or the index information of the communications device, where the third operation includes at least one of the following:

matching a target communications device based on the network element query information; and sending information about the target communications device.

In an optional embodiment of this application, the index information of the target communications device matches the network element query information.

In an optional embodiment of this application, that the index information of the target communications device matches the network element query information includes at least one of the following:

the index information of the target communications device includes the indication information for indicating the first access mode, and the network element query information includes the indication information for indicating the first access mode;

the index information of the target communications device includes the identification information of the second object, and the network element query information includes the identification information of the second object;

the index information of the target communications device includes the group identification information of the network group to which the second object belongs, and the network element query information includes the group identification information of the network group to which the second object belongs;

the index information of the target communications device includes a credential and/or subscription used for primary authentication and/or authorization, and the network element query information includes a credential and/or subscription used for primary authentication and/or authorization;

the index information of the target communications device includes a credential and/or subscription used for non-primary authentication and/or authorization, and the network element query information includes a credential and/or subscription used for non-primary authentication and/or authorization;

the index information of the target communications device includes the identification information of the second network, and the network element query information includes the identification information of the second network;

the index information of the target communications device includes the group identification information of the second network group, and the network element query information includes the group identification information of the second network group;

the index information of the target communications device includes the slice information, and the network element query information includes the slice information; and the index information of the target communications device includes the DN information, and the network element query information includes the DN information.

In an optional embodiment of this application, the acquiring index information of a communications device includes:

acquiring network element registration information; and generating the index information of the communications device based on the network element registration information, where the network element registration information includes at least one of the following: the indication information for indicating the first access mode, the type information of the credential and/or subscription, identification information of a third object, group identification information of a network group to which the third object belongs, identification information of a third network, and group identification information of a third network group; and the index information of the communications device includes one or more items of the network element registration information.

Optionally, the third object includes at least one of the following: a network A, an entity in a data network, an entity outside a first network, primary authentication and/or authorization, and non-primary authentication and/or authorization.

In an optional embodiment of this application, the first access mode includes at least one of the following:

an access mode for accessing a network to acquire a credential and/or subscription, an access mode with limited access to a network, and an access mode using a default credential to access a network.

The apparatus provided in this embodiment of this application can implement each process implemented by the method embodiment in FIG. 4, with the same technical effect achieved. To avoid repetition, details are not described herein again.

Figure 12:
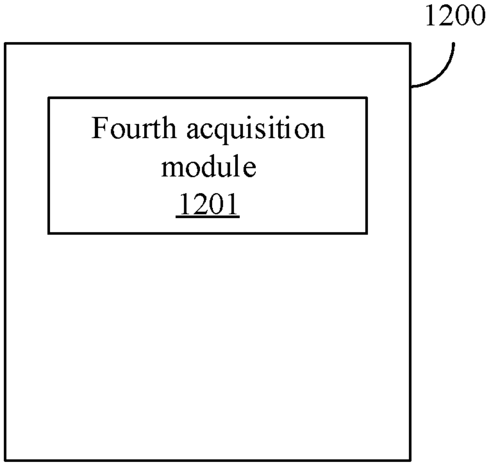
FIG. 12 is a fifth schematic diagram of an apparatus for supporting information acquisition according to an embodiment of this application.

Referring to FIG. 12, an embodiment of this application provides an apparatus for supporting information acquisition. The apparatus is applied to a fifth communications apparatus. The fifth communications apparatus 1200 includes:

a fourth acquiring module 1201, configured to acquire first configuration information and/or information associated with the first configuration information.

In an optional embodiment of this application, before the step of acquiring first configuration information and/or information associated with the first configuration information, the fifth communications apparatus 1200 further includes:

a second sending module 1202, configured to send second information, where the second information includes at least one of the following: indication information for indicating a first access mode, type information of a credential and/or subscription, identification information of a second object, group identification information of a network group to which the second object belongs, slice information associated with the second object, DN information associated with the second object, identification information of a second network, group identification information of a second network group, where the second network group is a network group to which the second network belongs, slice information of a terminal, DN information of the terminal, connection establishment request information, registration request information, or data channel establishment request information.

In an optional embodiment of this application, the second sending module 1202 is further configured to:

in a case that a first condition is met, send the second information, where the first condition includes at least one of the following:

the terminal supports acquisition of a credential and/or subscription of a network in a user-plane mode;

the terminal acquires the credential and/or subscription of the network in the user-plane mode;

the terminal needs to acquire a credential and/or subscription used for primary authentication and/or authorization;

the terminal needs to acquire a credential and/or subscription used for non-primary authentication and/or authorization;

the terminal needs to acquire a credential and/or subscription of the second network or the second object; and the terminal does not have address information of a first server corresponding to the second network or the second object.

In an optional embodiment of this application, after the step of acquiring first configuration information and/or information associated with the first configuration information, the fifth communications apparatus 1200 further includes:

a fourth execution module, configured to perform at least one of the following based on the first configuration information and/or the information associated with the first configuration information:

establishing a first data channel; and requesting to acquire a credential and/or subscription from a first server, where the first data channel is used for interaction between the terminal and the first server.

In an implementation, the credential and/or subscription is a credential and/or subscription of the first object in the information associated with the first configuration information.

The apparatus provided in this embodiment of this application can implement each process implemented by the method embodiment in FIG. 5, with the same technical effect achieved. To avoid repetition, details are not described herein again.

Figure 13:
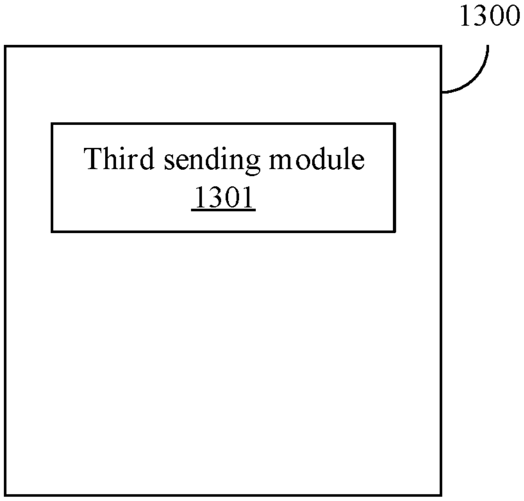
FIG. 13 is a sixth schematic diagram of an apparatus for supporting information acquisition according to an embodiment of this application.

Referring to FIG. 13, an embodiment of this application provides an apparatus for supporting information acquisition. The apparatus is applied to a sixth communications device. The apparatus 1300 includes:

a third sending module 1301, configured to send network element registration information, where the network element registration information includes at least one of the following: indication information for indicating a first access mode, type information of a credential and/or subscription, identification information of a third object, group identification information of a network group to which the third object belongs, identification information of a third network, and group identification information of a third network group, where the third object includes at least one of the following: a network A, an entity in a data network, an entity outside a first network, primary authentication and/or authorization, and non-primary authentication and/or authorization.

In an optional embodiment of this application, the indication information for indicating the first access mode indicates that the sixth communications device is used for a terminal that accesses a network in the first access mode or used for the first access mode;

and/or the type information of the credential and/or subscription indicates that the sixth communications device is configured to provide at least one of the following: configuration information related to primary authentication and/or authorization, and configuration information related to non-primary authentication and/or authorization;

and/or the identification information of the third object indicates that the sixth communications device is configured to serve the third object or configured to provide configuration information related to the third object;

and/or the group identification information of the network group to which the third object belongs indicates that the sixth communications device is configured to serve an object in the network group or configured to provide configuration information related to an object in the network group;

and/or the identification information of the third network indicates that the sixth communications device is configured to serve the third network or configured to provide configuration information related to the third network;

and/or the group identification information of the third network group indicates that the sixth communications device is configured to serve a network in the network group or configured to provide configuration information related to a network in the network group.

The apparatus provided in this embodiment of this application can implement each process implemented by the method embodiment in FIG. 6, with the same technical effect achieved. To avoid repetition, details are not described herein again.

Figure 14:
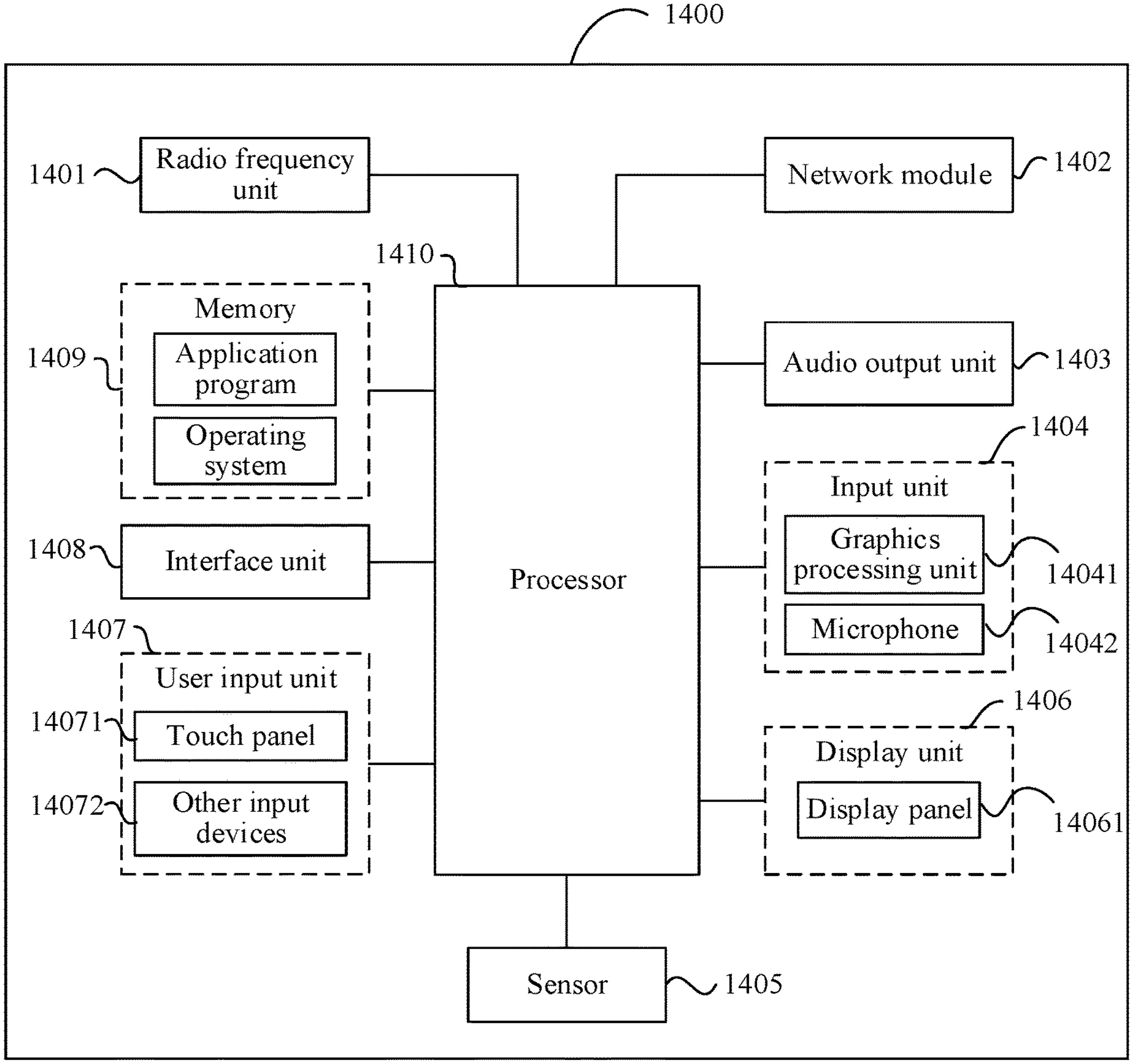
FIG. 14 is a schematic diagram of a terminal according to an embodiment of this application.

FIG. 14 is a schematic structural diagram of hardware of a terminal for implementing the embodiments of this application. The terminal 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

Persons skilled in the art can understand that the terminal 1400 may further include a power supply (for example, a battery) supplying power to the components, and the power supply may be logically connected to the processor 1410 through a power management system. In this way, functions such as charge management, discharge management, and power consumption management are implemented by using the power management system. The structure of the terminal shown in FIG. 14 does not constitute any limitation on the terminal. The terminal may include more or fewer components than those shown in the figure, or a combination of some components, or the components disposed differently. Details are not described herein again.

It can be understood that in this embodiment of this application, the input unit 1404 may include a graphics processing unit (GPU) 14041 and a microphone 14042. The graphics processing unit 14041 processes image data of a still picture or video obtained by an image capture apparatus (such as a camera) in a video capture mode or an image capture mode. The display unit 1406 may include a display panel 14061, and the display panel 14061 may be configured in a form of a liquid crystal display, an organic light-emitting diode, and the like. The user input unit 1407 may include a touch panel 14071 and other input devices 14072. The touch panel 14071 is also referred to as a touchscreen. The touch panel 14071 may include two parts: a touch detection apparatus and a touch controller. The other input devices 14072 may include but are not limited to a physical keyboard, a function key (such as a volume control key or a power on/off key), a trackball, a mouse, a joystick, and the like. Details are not described herein.

In this embodiment of this application, the radio frequency unit 1401 receives downlink data from a network-side device, and then sends the downlink data to the processor 1410 for processing; and also sends uplink data to the network-side device. Generally, the radio frequency unit 1401 includes but is not limited to an antenna, at least one amplifier, a transceiver, a coupler, a low noise amplifier, a duplexer, and the like.

The memory 1409 may be configured to store software programs or instructions and various data. The memory 1409 may include a program or instruction storage area and a data storage area. The program or instruction storage area may store an operating system, an application program or instruction required by at least one function (for example, a sound playback function or an image playback function), and the like. In addition, the memory 1409 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 1410 may include one or more processing units. Optionally, an application processor and a modem processor may be integrated in the processor 1410. The application processor primarily processes an operating system, user interfaces, application programs or instructions, and the like. The modem processor primarily processes radio communication, for example, being a baseband processor. It can be understood that the modem processor may alternatively be not integrated in the processor 1410.

The terminal provided in this embodiment of this application is capable of implementing the processes implemented in the method embodiment shown in FIG. 5, with the same technical effects achieved. To avoid repetition, details are not described herein again.

Figure 15:
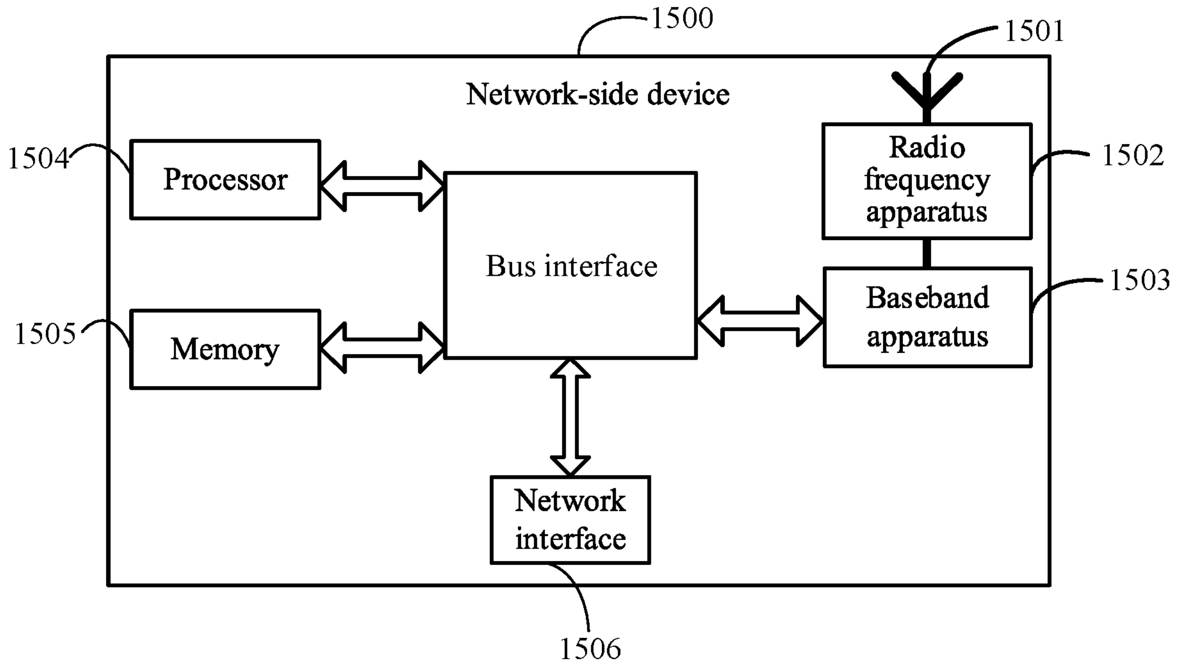
FIG. 15 is a schematic diagram of a network-side device according to an embodiment of this application.

Specifically, an embodiment of this application further provides a network-side device. As shown in FIG. 15, the network-side device 1500 includes an antenna 1501, a radio frequency apparatus 1502, and a baseband apparatus 1503. The antenna 1501 is connected to the radio frequency apparatus 1502. In an uplink direction, the radio frequency apparatus 1502 receives information by using the antenna 1501, and sends the received information to the baseband apparatus 1503 for processing. In a downlink direction, the baseband apparatus 1503 processes to-be-sent information, and sends the information to the radio frequency apparatus 1502; and the radio frequency apparatus 1502 processes the received information and then sends the information out by using the antenna 1501.

The frequency band processing apparatus may be located in the baseband apparatus 1503. The method performed by the network-side device in the foregoing embodiments may be implemented in the baseband apparatus 1503, and the baseband apparatus 1503 includes a processor 1504 and a memory 1505.

The baseband apparatus 1503 may include, for example, at least one baseband board, where a plurality of chips are disposed on the baseband board. As shown in FIG. 15, one of the chips, for example, the processor 1504, is connected to the memory 1505, to invoke a program in the memory 1505 to perform the operation of the network device shown in the foregoing method embodiments.

The baseband apparatus 1503 may further include a network interface 1506, configured to exchange information with the radio frequency apparatus 1502, where the interface is, for example, a common public radio interface (CPRI).

Specifically, the network-side device in this embodiment of this application further includes: instructions or a program stored in the memory 1505 and capable of running on the processor 1504. The processor 1504 invokes the instructions or program in the memory 1505 to execute the method executed by the modules shown in FIG. 10 to FIG. 13, with the same technical effects achieved. To avoid repetition, details are not described herein again.

An embodiment of this application further provides a computer program product, where the computer program product is stored in a non-transitory readable storage medium, and the computer program product is executed by at least one processor to implement the steps of the processing method shown in FIG. 1 to FIG. 4 and FIG. 6.

An embodiment of this application further provides a readable storage medium. The readable storage medium may be non-volatile or volatile. A program or instructions are stored in the readable storage medium. When the program or the instructions are executed by a processor, the processes of the foregoing embodiment of the method shown in FIG. 1 to FIG. 6 can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network-side device to implement the processes of the foregoing method embodiments shown in FIG. 1 to FIG. 6, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for supporting information acquisition, performed by a second communications device, wherein the method comprises:

acquiring first information, wherein the first information comprises first configuration information associated with slice information and/or data network (DN) information; and performing a first operation based on the first information, wherein the first operation comprises at least one of the following:

acquiring slice information of a terminal and/or DN information of a terminal, and confirming, based on the slice information of the terminal and/or the DN information of the terminal, first configuration information associated with the slice information of the terminal and/or the DN information of the terminal; or sending the first configuration information, wherein the first configuration information is the first configuration information associated with the slice information of the terminal and/or the DN information of the terminal;

wherein the first configuration information comprises the address information of the first server, wherein the first server is capable of configuring a credential and/or subscription of a first object for the terminal.

2. The method according to claim 1, wherein the first object comprises at least one of the following: a network A, an entity in a data network, an entity outside a first network, primary authentication and/or authorization, non-primary authentication and/or authorization, slice information, DN information, an object associated with primary authentication and/or authorization, and an object associated with non-primary authentication and/or authorization, wherein the network A is the same as or different from the first network;

or the first server comprises at least one of the following: a first server used for primary authentication and/or authorization configuration, and a first server used for non-primary authentication and/or authorization configuration, wherein the first server used for primary authentication and/or authorization configuration is capable of configuring the credential and/or subscription of the first object for the terminal, and the credential and/or subscription is used for primary authentication and/or authorization; and the first server used for non-primary authentication and/or authorization configuration is capable of configuring the credential and/or subscription of the first object for the terminal, and the credential and/or subscription is used for non-primary authentication and/or authorization.

3. The method according to claim 2, wherein a network type of the first network and/or a network type of the network A comprises at least one of the following: a public network, a non-public network, a PLMN, a PNI NPN, or an SNPN.

4. The method according to claim 1, wherein the address information of the first server comprises at least one of the following: an Internet Protocol address of the first server, a media access control address of the first server, a port number of the first server, a protocol type for configuring the credential and/or subscription, a protocol version of the first server, or address index information of the first server.

5. The method according to claim 1, the first operation further comprises acquiring first request information, and querying or receiving subscribed first configuration information based on the first request information;

wherein the first request information comprises at least one of the following:

indication information for indicating a first access mode;

type information of the credential and/or subscription;

identification information of a second object;

group identification information of a network group to which the second object belongs;

identification information of a second network;

group identification information of a second network group, wherein the second network group is a network group to which the second network belongs;

slice information associated with the second object;

DN information associated with the second object;

the slice information of the terminal; or the DN information of the terminal, wherein the type information of the credential and/or subscription comprises at least one of the following: a credential and/or subscription used for primary authentication and/or authorization, and a credential and/or subscription used for non-primary authentication and/or authorization; and the second object comprises at least one of the following: a network A, an entity in a data network, an entity outside a first network, primary authentication and/or authorization, non-primary authentication and/or authorization, slice information, DN information, an object associated with primary authentication and/or authorization, and an object associated with non-primary authentication and/or authorization.

6. The method according to claim 5, wherein the operation of querying or receiving subscribed first configuration information based on the first request information comprises at least one of the following:

the identification information of the first object comprised in index information of the queried or subscribed first configuration information matches identification information of a second object in the first request information;

the group identification information of the network group to which the first object belongs, comprised in the index information of the queried or subscribed first configuration information, matches group identification information of a second network group in the first request information;

identification information of the network A comprised in the index information of the queried or subscribed first configuration information matches identification information of a second network in the first request information;

group identification information of a network group to which the network A belongs, comprised in the index information of the queried or subscribed first configuration information, matches the identification information of the second network in the first request information;

the identification information of the network to which the first server belongs, comprised in the index information of the queried first configuration information, matches the identification information of the second network in the first request information;

the group identification information of the network group to which the first server belongs, comprised in the index information of the queried or subscribed first configuration information, matches the group identification information of the second network group in the first request information;

the index information of the queried first configuration information comprises the first access mode, and the first request information comprises the indication information for indicating the first access mode;

the index information of the queried or subscribed first configuration information comprises a credential and/or subscription used for primary authentication and/or authorization, and the first request information comprises a credential and/or subscription used for primary authentication and/or authorization; or the index information of the queried or subscribed first configuration information comprises a credential and/or subscription used for non-primary authentication and/or authorization, and the first request information comprises a credential and/or subscription used for non-primary authentication and/or authorization.

7. The method according to claim 1, wherein the step of sending the first configuration information comprises: in a case that a second condition is met, sending the first configuration information, wherein the second condition comprises at least one of the following:

the terminal registers with or accesses a first network; or the first configuration information is generated or updated.

8. The method according to claim 1, the first operation further comprises setting a priority of the first information to be higher than a priority of policy information related to a data operation;

wherein the operation of setting a priority of the first information to be higher than a priority of policy information related to a data operation comprises: in a case that a third condition is met, setting the priority of the first information to be higher than the priority of the policy information related to the data operation, wherein the third condition comprises at least one of the following:

the first information is first information acquired through reception; or the first information is not locally configured first information.

9. A network-side device, comprising a processor, a memory, and a program stored in the memory and capable of running on the processor, wherein when the program is executed by the processor, implements:

acquiring first information, wherein the first information comprises first configuration information associated with slice information and/or data network (DN) information; and performing a first operation based on the first information, wherein the first operation comprises at least one of the following:

acquiring slice information of a terminal and/or DN information of a terminal, and confirming, based on the slice information of the terminal and/or the DN information of the terminal, first configuration information associated with the slice information of the terminal and/or the DN information of the terminal; or sending the first configuration information and/or the information associated with the first configuration information, wherein the first configuration information is the first configuration information associated with the slice information of the terminal and/or the DN information of the terminal;

wherein the first configuration information comprises the address information of the first server, wherein the first server is capable of configuring a credential and/or subscription of a first object for the terminal.

10. The network-side device according to claim 9, wherein the first object comprises at least one of the following: a network A, an entity in a data network, an entity outside a first network, primary authentication and/or authorization, non-primary authentication and/or authorization, slice information, DN information, an object associated with primary authentication and/or authorization, and an object associated with non-primary authentication and/or authorization, wherein the network A is the same as or different from the first network;

or the first server comprises at least one of the following: a first server used for primary authentication and/or authorization configuration, and a first server used for non-primary authentication and/or authorization configuration, wherein the first server used for primary authentication and/or authorization configuration is capable of configuring the credential and/or subscription of the first object for the terminal, and the credential and/or subscription is used for primary authentication and/or authorization; and the first server used for non-primary authentication and/or authorization configuration is capable of configuring the credential and/or subscription of the first object for the terminal, and the credential and/or subscription is used for non-primary authentication and/or authorization.

11. The network-side device according to claim 10, wherein a network type of the first network and/or a network type of the network A comprises at least one of the following: a public network, a non-public network, a PLMN, a PNI NPN, or an SNPN.

12. The network-side device according to claim 9, wherein the address information of the first server comprises at least one of the following: an Internet Protocol address of the first server, a media access control address of the first server, a port number of the first server, a protocol type for configuring the credential and/or subscription, a protocol version of the first server, or address index information of the first server.

13. The network-side device according to claim 9, wherein the first information further comprises information associated with the first configuration information;

wherein the information associated with the first configuration information comprises indication information for indicating a first access mode, indicating one of the following: the first configuration service information is used for the terminal that accesses a first network in the first access mode, and the first server is capable of configuring the credential and/or subscription of the first object for the terminal that accesses the first network in the first access mode;

wherein the first access mode comprises at least one of the following:

an access mode for accessing a network to acquire a credential and/or subscription, an access mode with limited access to a network, or an access mode using a default credential to access a network.

14. The method according to claim 1, wherein the first information further comprises information associated with the first configuration information;

wherein the information associated with the first configuration information comprises at least one of the following:

slice information associated with the first configuration information;

DN information associated with the first configuration information;

slice information associated with the first object;

DN information associated with the first object;

identification information of the first object;

group identification information of a network group to which the first object belongs;

identification information of a network to which the first server belongs;

group identification information of a network group to which the first server belongs;

type information of the credential and/or subscription; or indication information for indicating a first access mode, indicating one of the following: the first configuration service information is used for the terminal that accesses a first network in the first access mode, and the first server is capable of configuring the credential and/or subscription of the first object for the terminal that accesses the first network in the first access mode.

15. The method according to claim 1, wherein the first operation further comprises sending the first information to the first target end and/or sending the first information by using related signaling of a data channel of the terminal;

wherein the first target at least one of the following: a communications network element responsible for session management or the communications network element responsible for policy control.

16. The method according to claim 1, wherein the second communications device is a communications network element responsible for session management.

17. The method according to claim 1, wherein the acquiring first information comprises locally configuring the first information or receiving the first information.

18. The method according to claim 14, wherein the type information of the credential and/or subscription comprises at least one of the following: a credential and/or subscription used for primary authentication and/or authorization, or a credential and/or subscription used for non-primary authentication and/or authorization; or the terminal accessing the first network accesses the first network in the first access mode.

19. The method according to claim 14, wherein the first access mode comprises at least one of the following:

an access mode for accessing a network to acquire a credential and/or subscription, an access mode with limited access to a network, or an access mode using a default credential to access a network.

20. A non-transitory readable storage medium, wherein the non-transitory readable storage medium stores a program or instructions, and the program or the instructions are executed by a processor to perform:

acquiring first information, wherein the first information comprises first configuration information associated with slice information and/or data network (DN) information; and performing a first operation based on the first information, wherein the first operation comprises at least one of the following:

acquiring slice information of a terminal and/or DN information of a terminal, and confirming, based on the slice information of the terminal and/or the DN information of the terminal, first configuration information associated with the slice information of the terminal and/or the DN information of the terminal; or sending the first configuration information and/or the information associated with the first configuration information, wherein the first configuration information is the first configuration information associated with the slice information of the terminal and/or the DN information of the terminal;

wherein the first configuration information comprises the address information of the first server, wherein the first server is capable of configuring a credential and/or subscription of a first object for the terminal.

* * * * *